United States Patent
Hagiwara

(10) Patent No.: US 8,145,000 B2
(45) Date of Patent: Mar. 27, 2012

(54) IMAGE DATA COMPRESSING METHOD AND IMAGE DATA COMPRESSING APPARATUS

(75) Inventor: Takahiro Hagiwara, Chiba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1013 days.

(21) Appl. No.: 12/105,587

(22) Filed: Apr. 18, 2008

(65) Prior Publication Data

US 2009/0110315 A1   Apr. 30, 2009

Related U.S. Application Data

(60) Provisional application No. 60/983,426, filed on Oct. 29, 2007.

(51) Int. Cl.
*G06K 9/36* (2006.01)
(52) U.S. Cl. ............ 382/232; 382/166; 382/250
(58) Field of Classification Search .......... 382/232, 382/166, 250; 341/65, 67; 375/240.23; 370/419, 370/463; 708/513; 709/231; 710/22, 24; 712/233
See application file for complete search history.

(56) References Cited

U.S. PATENT DOCUMENTS 7,535,386 B2 *  5/2009  Nakata et al. ............ 341/67
7,876,330 B2    1/2011  Hagiwara

FOREIGN PATENT DOCUMENTS

| JP | 2000-069478 | 3/2000 |
| JP | 2001-309386 | 11/2001 |
| JP | 2002-359743 | 12/2002 |
| JP | 2004-104677 | 4/2004 |
| JP | 2004-110250 | 4/2004 |
| JP | 2007-087191 | 4/2007 |

* cited by examiner

*Primary Examiner* — Anh Hong Do
(74) *Attorney, Agent, or Firm* — Turocy & Watson, LLP

(57) ABSTRACT

An image data compressing method, including: storing a plurality of data components of an original image data; assigning a value to a first bit sequence, where the first bit sequence includes a first group of bits associated with zero data components in the plurality of data components and a second group of bits associated with non-zero data components in the plurality of data components, each bit of the first group is assigned a first value, each bit of the second group is assigned a second value different from the first value; counting a first number which is a number of the first value continuing in the first bit sequence; obtaining a significant bit length of at least one of the plurality of data components; translating a combination of the first number and the significant bit length to a code obtained by looking up a coding table; and joining the code to a bit stream of a compressed image data.

12 Claims, 38 Drawing Sheets

IMAGE DATA COMPRESSING METHOD AND IMAGE DATA COMPRESSING APPARATUS

CROSS-REFERENCE TO RELATED APPLICATIONS

This non-provisional application is based upon and claims the benefit of priority from U.S. provisional application 60/983426 filed on Oct. 29, 2007, the entire contents of which are incorporated herein by reference.

TECHNICAL FIELD

Exemplary embodiments described herein relate to an image data compressing method and image data compressing apparatus.

BACKGROUND

Image data compression methods such as a JPEG and MPEG include processing parts suitable for implementation in parallel algorithms. For example, color space conversion processing, DCT (Discrete cosine transform) processing, iDCT (inverse DCT) processing and quantization processing are suitable for implementation in parallel algorithms. JP-2000-69478-A2 and JP-2001-309386-A2 describe using SIMD (Single Instruction Multi Data) instructions and a processor capable of executing the SIMD instruction to process such processing parts suitable for implementation in parallel algorithms.

On the other hand the image data compression methods include processing parts not suitable for implementation in parallel algorithms, also. For example, so called processing VLC (Variable Length Coding) is not suitable for implementation in parallel algorithms. In JP-2000-69478-A2 and JP-2001-309386-A2, the VLC is not processed by software, but instead is processed by a dedicated hardware circuit. A problem associated with such a dedicated hardware circuit is the relatively high cost compared to software implementation.

SUMMARY

The following presents a simplified summary in order to provide a basic understanding of one or more aspects of the invention. This summary is not an extensive overview of the invention. It is not intended to identify key or critical elements, nor to delineate the scope of the claimed subject matter. Rather, the sole purpose of this summary is to present some concepts of the invention in a simplified form as a prelude to the more detailed description that is presented hereinafter.

According to an exemplary embodiment, one aspect of the invention is an image data compressing method involving storing a plurality of data components of an original image data; assigning a value to a first bit sequence, where the first bit sequence includes a first group of bits associated with zero data components in the plurality of data components and a second group of bits associated with non-zero data components in the plurality of data components, each bit of the first group is assigned a first value, each bit of the second group is assigned a second value different from the first value; counting a first number which is a number of the first value continuing in the first bit sequence; obtaining a significant bit length of at least one of the plurality of data components; translating a combination of the first number and the significant bit length to a code obtained by looking up a coding table; and joining the code to a bit stream of a compressed image data.

Another aspect of the invention relates to an image data compressing apparatus, containing: a first register configured to store a plurality of data components of an original image data; a second register configured to store a first bit sequence containing a first value and a second value, the second register containing a first group of bits associated with zero data components in the plurality of data components and a second group of bits associated with non-zero data components in the plurality of data components, each bit of the first group being assigned the first value, each bit of the second group being assigned the second value, the second value different form the first value; a first arithmetic logic unit configured to obtain a first number of the first value continuing in the second register and a significant bit length of at least one of the plurality of data components, and configured to translate a combination of the first number and the significant bit length to a code; and a memory access unit configured to store the code as a part of a bit stream of a compressed image data.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following description when considered in conjunction with the drawings.

BRIEF DESCRIPTION OF THE SEVERAL VIEWS OF THE DRAWINGS

The invention and attendant advantages therefore are best understood from the following description of the non-limiting embodiments when read in connection with the accompanying Figures, wherein.

DETAILED DESCRIPTION

Figure 1:
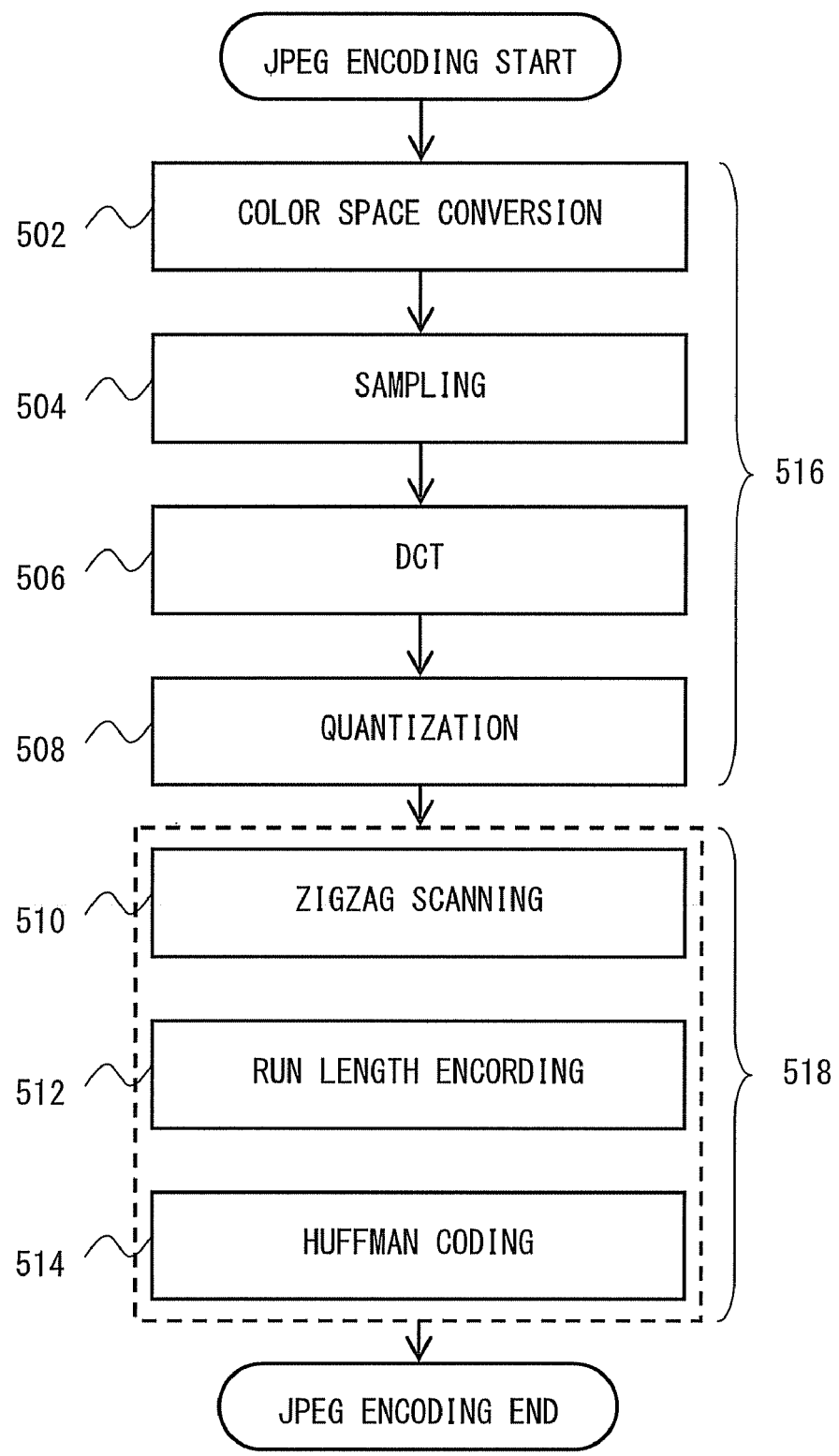
FIG. 1 is a diagram illustrating a flowchart of an exemplary JPEG compression method.

Referring now to the Figures in which like reference numerals designate identical or corresponding parts throughout the several views.

In accordance with an aspect of the invention, VLC (Variable Length Coding) can be reorganized into a plurality of parts including appropriate parts for implementation in a parallel algorithm for high speed image data compression processing.

(1-1) Outline of the JPEG Compression

FIG. 1 illustrates a flowchart of an exemplary JPEG compression method. The exemplary JPEG compression method may be organized as actions described below.

Color space conversion (Act 502): the original image data representing values of color components R (red), G (Green) and B (Blue) is converted into another image data representing values of color components Y (luma component), Cb (blue chroma component) and Cr (red chroma component). Herein after, the values of color components R, G and B are collectively termed RGB components, the image data representing values of color components R, G and B is so called an original RGB image data, the values of color components Y, Cb and Cr are collectively termed YCbCr components, and the image data representing values of color components Y, Cb and Cr is termed an original YCbCr image data.

Figure 2:
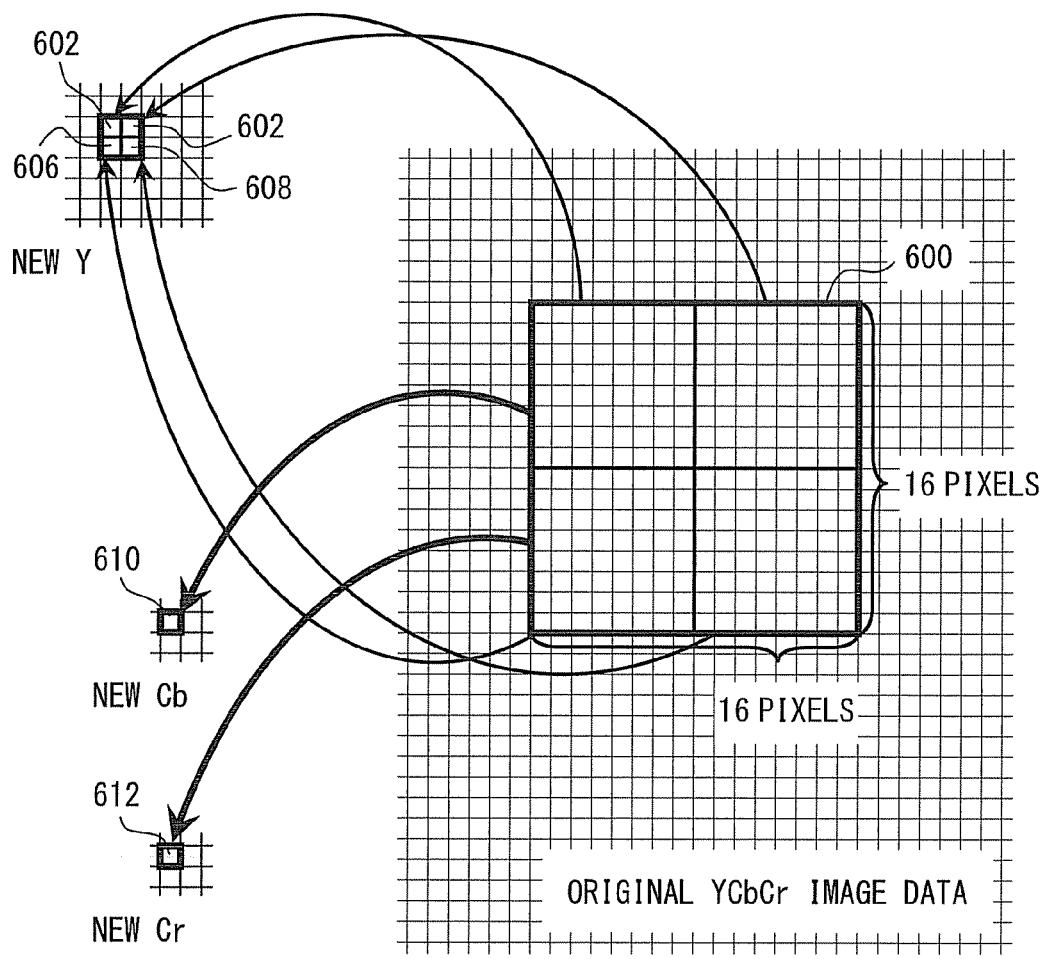
FIG. 2 is a diagram illustrating an exemplary relationship between an original YCbCr image data and components of new Y, new Cb and new Cr.

Sampling (Act 504): new YCbCr components are sampled from the original YCbCr image data. A piece of new Y component can be produced from a unit of plural pixels, or a pixel, of the original YCbCr image data. For example, two square (2×2) pieces of new Y components 602, 604, 606 and 608 may be produced from a unit of sixteen square (16×16) pixels of the original YCbCr image data 600 as illustrated in FIG. 2. Although the precise number of pixels of the original YCbCr image data which the new pieces of Y components are produced from is an optional matter and may vary from one operation to another.

Additionally, the numbers of pieces of a new Cb component and a new Cr component may differ from the number of pieces of the new Y component. For example, two pieces for each of new Cb component and new Cr component are sampled from a unit of sixteen square (16×16) pixels of the original YCbCr image data of which four pieces of new Y component are produced from a 4:2:2 subsampling ratio. One piece for each of new Cb component 610 and new Cr component 612 are sampled from a unit of sixteen square (16×16) pixels of the original YCbCr image data 600 which four pieces of new Y components 602, 604, 606 and 608 are produced from a 4:1:1 subsampling ratio. These are illustrated in FIG. 2. The new Y, Cb, and Cr components are respectively organized in units of eight square (8×8) pieces.

Figure 3:
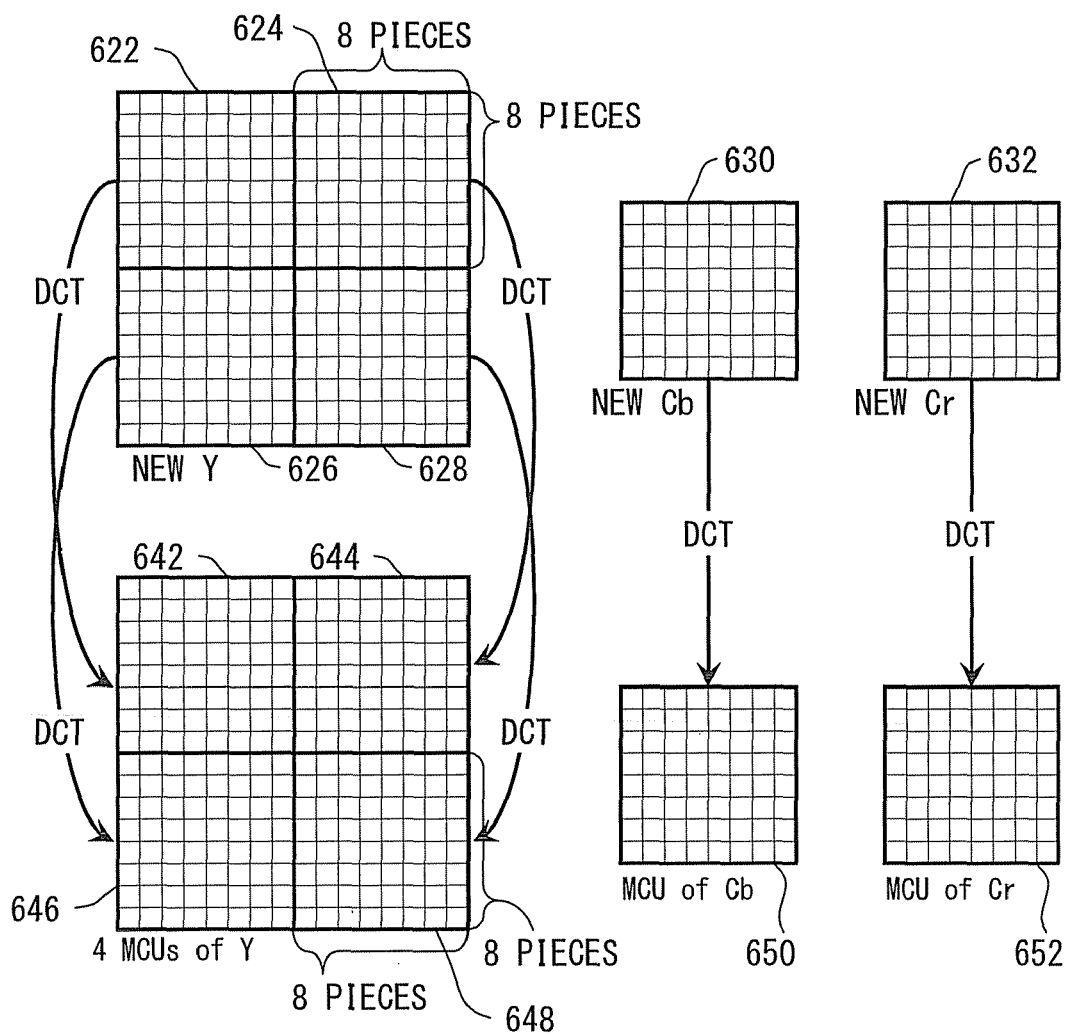
FIG. 3 is a diagram illustrating an exemplary relationship between new Y components and MCUs of Y under 4:1:1 subsampling ratio.

DCT (Act 506): Regardless of kind of components, DCT processing is applied to each of the units of eight square (8×8) pieces. FIG. 3 illustrates an exemplary diagram of components produced at a 4:1:1 subsampling ratio. Each unit of eight square (8×8) pieces of new Cb component 630 and new Cr component 632 corresponds to four units of eight square (8×8) pieces 622, 624, 626 and 628. Each of units 622 through 632 is converted into MCU (Minimum Coded Unit) 642 through 652 which also includes eight square (8×8) pieces of components.

Figure 4:
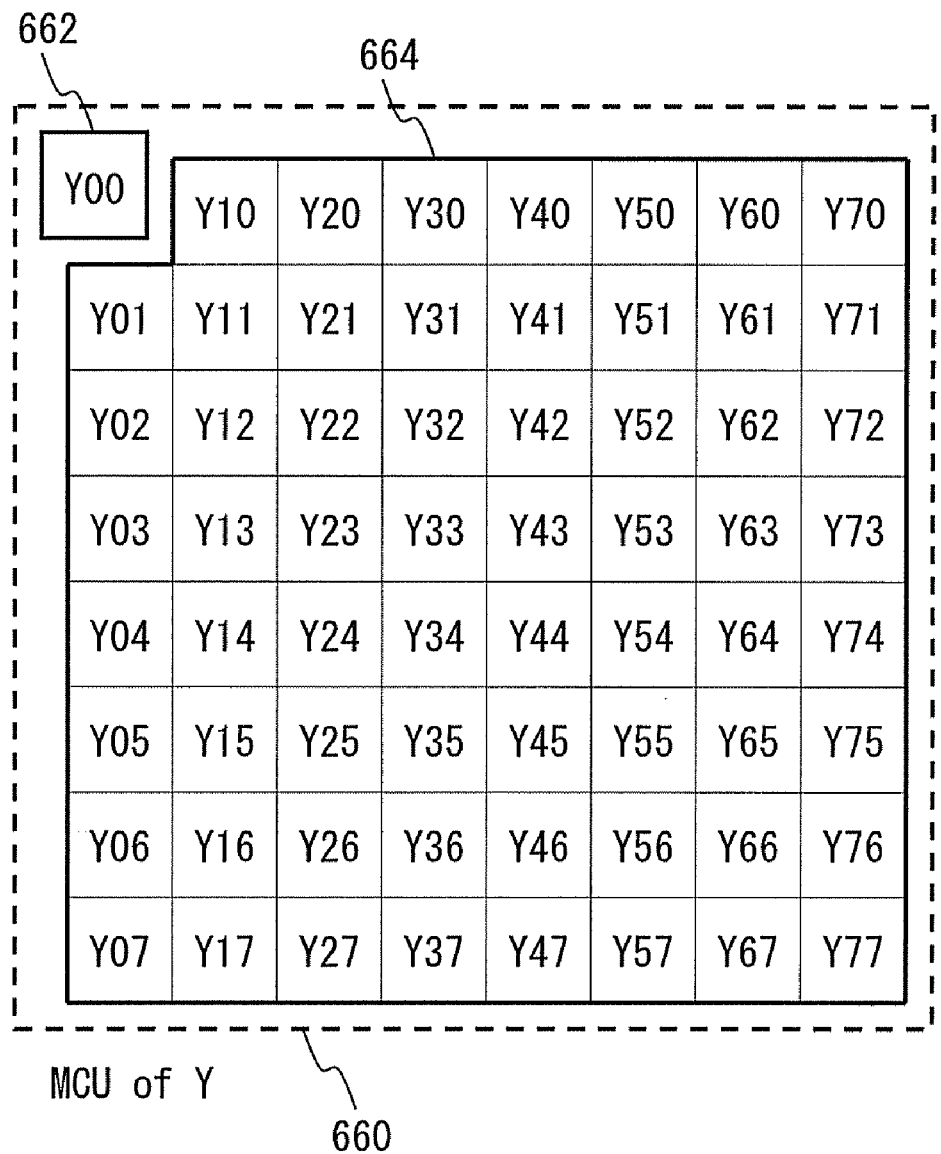
FIG. 4 is a diagram illustrating an exemplary MCU of piece of new Y components.

FIG. 4 illustrates an exemplary diagram of MCU of piece of new Y components. Each of the MCU also includes eight square (8×8) piece of components. Generally, a DC (Direct Current) component 662 of the MCU 660 is noted at the most upper left position in an illustration or a matrix of the MCU 660. Other 63 AC (Alternate Current) components 664 are noted in order of their corresponding frequencies and directions from the most upper left position. In FIG. 4, the left letter indicates a sign of component such as Y, Cb or Cr, the central digit indicates a horizontal frequency 0 through 7, and the right digit indicates a vertical frequency 0 through 7.

Quantization (Act 508): Each of MCUs is quantized with weight coefficients. The weigh coefficients include eight square (8×8) components corresponding to the components of MCU.

The color space conversion (Act 502), the sampling (Act 504), the DCT (Act 506) and the quantization (Act 508) are collectively termed post processing 516. A large variety of modifications can be applied in the post processing 516 as well as a modification to avoid dependency among image data that is suitable for implementation in parallel algorithms.

On the other hand, VLC 518 includes processing parts previously thought difficult to avoid dependency among image data described below.

Figure 5:
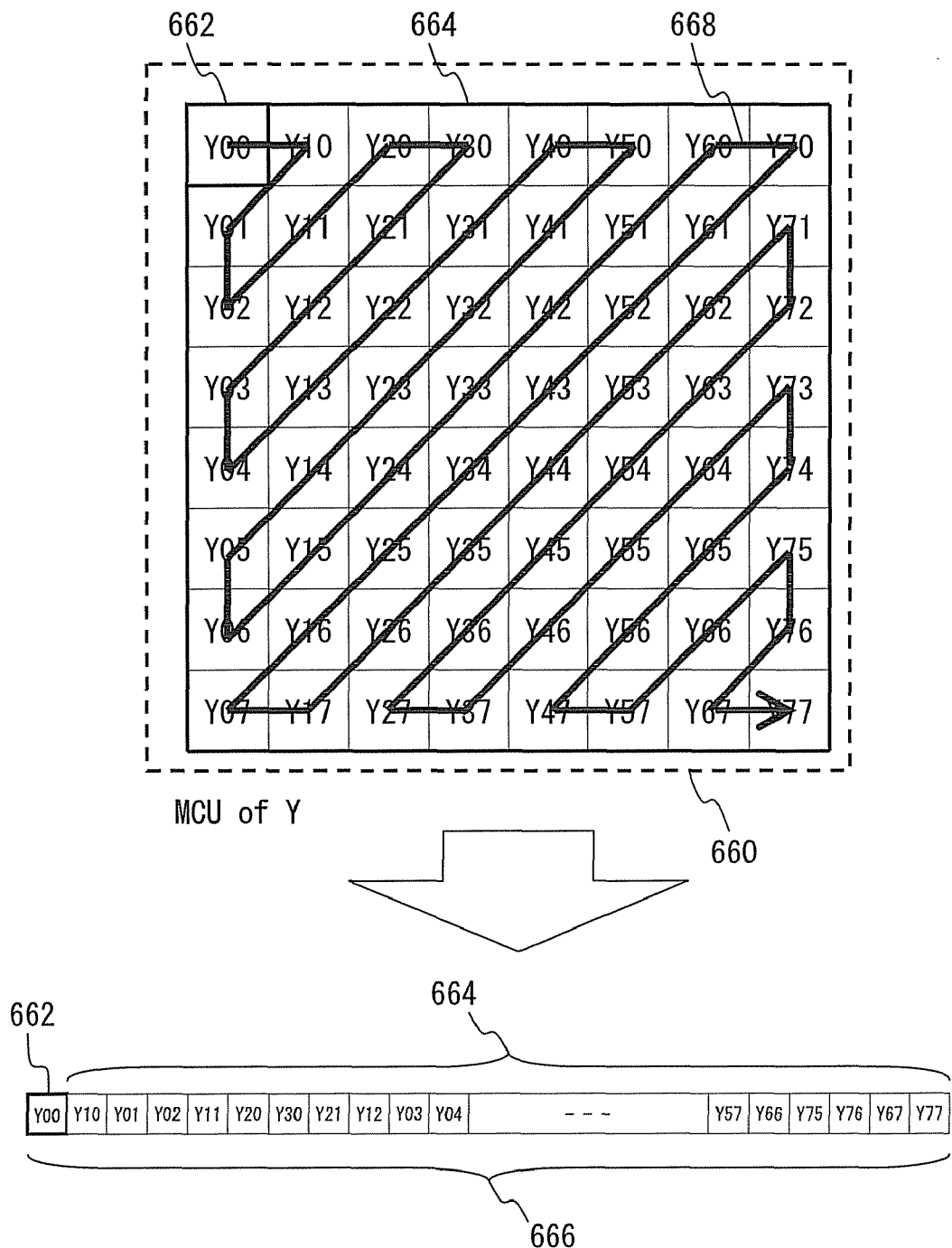
FIG. 5 is a diagram illustrating an exemplary matrixes of piece of new Y components in a two dimensional MCU and a one dimensional MCU.

Zigzag scanning (Act 510): Each of quantized MCUs, which stores components in a two dimensional matrix, is scanned to transplant the components into a one dimensional matrix. FIG. 5 illustrates an exemplary diagram of matrixes of piece of new Y components in a two dimensional MCU 660 and a one dimensional MCU 666. The components included in the two dimensional MCU 660 are scanned in the order indicated with the thick arrow line 668 starting from the most upper left component and finishing at the most lower right component in the two dimensional MCU 660, and aligned in the one dimensional MCU 666 in order of the scanning. In the one dimensional MCU 666, a first component is the DC component, and a sixty fourth component is the most high frequency AC component.

Run length encoding (Act 512): A number of zero data continuing in the one dimensional MCU 666 is counted as a significant bit number. In other words, the one dimensional MCU 666 is encoded by using run length encoding. A plurality of significant bit numbers of the zero data and a plurality of non-zero data which follow the zero data continuing are recognized.

Huffman coding (Act 514): A Huffman coding is applied independently to a significant bit number of zero data of DC component. Non-zero data immediately following the zero data continuing in the DC component are combined after the Huffman-coded significant bit number.

Huffman coding together with a significant bit number of non-zero data is applied to each of significant bit numbers of zero data of AC components. The non-zero data are immediately following the zero data in the one dimensional MCU. The non-zero data are combined after the Huffman-coded significant bit number.

If the number of zero data continuing is greater than sixteen, the Huffman coding is applied to a ZRL (Zero Run Length) code instead of the significant bit numbers. The Huffman coded ZRL code is used instead of a combination of the Huffman-coded significant bit number and the non-zero data. The residual number of zero data continuing, which means the residual of the number of zero data subtracting sixteen, is used as a significant bit number of zero data to be applied the Huffman coding together with the significant bit number of non-zero data.

Those combined Huffman-coded significant bit numbers and non-zero data are further combined with each other one dimensionally in order of the frequency of source components in the one dimensional MCU, to form an encoded data.

If the last data of the encoded data is not zero data, Huffman coded EOB (End Of Block) code is combined after the end of the encoded data.

The exemplary JPEG compression method may be organized as actions described above. Hereinafter, an exemplary implementation of the VLC 518 is described in particular with reference to FIG. 6.

(1-2) Exemplary VLC

Figure 6:
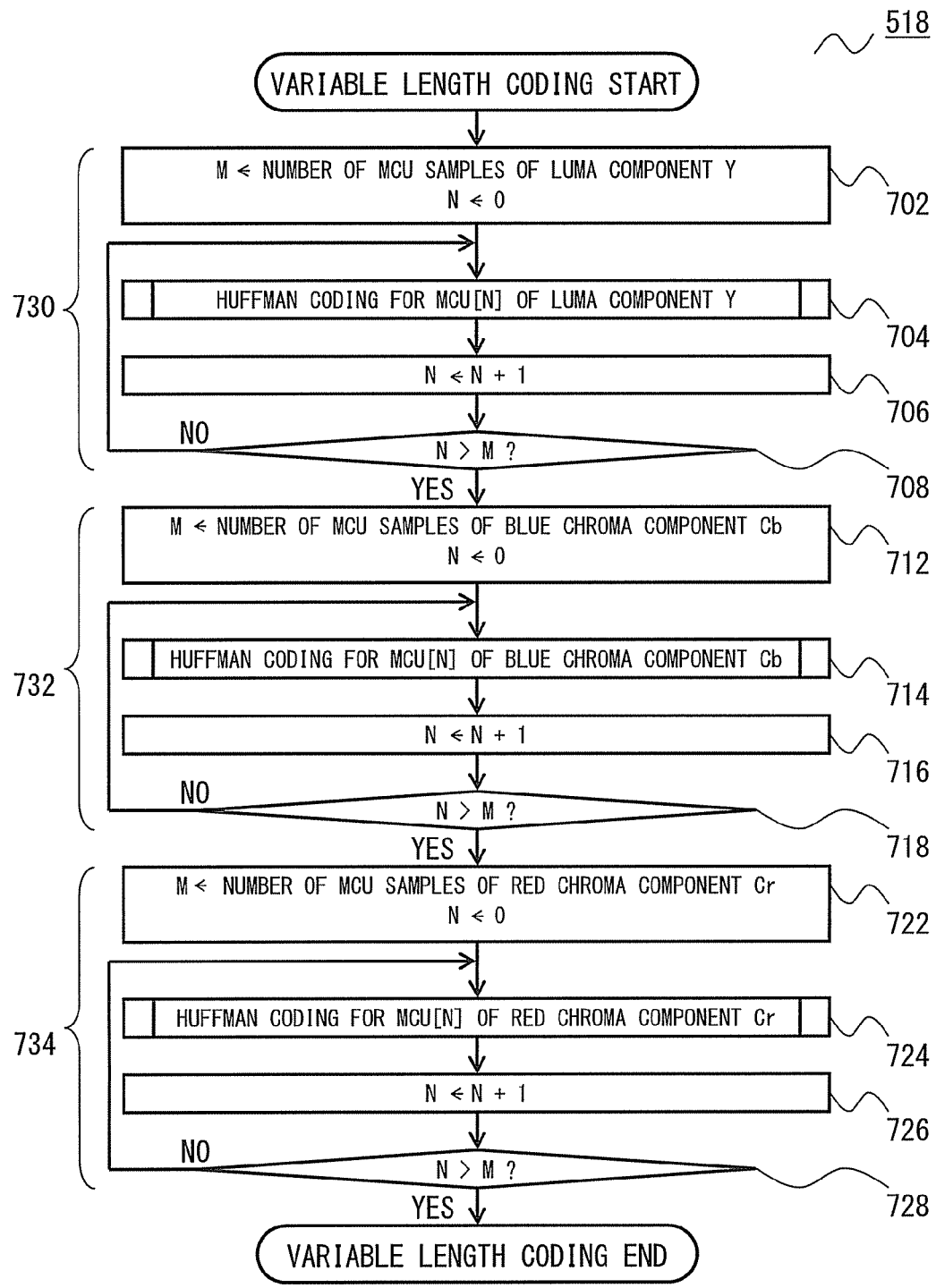
FIG. 6 is a diagram illustrating an a flowchart of a exemplary Variable Length Coding.

FIG. 6 illustrates a flowchart of the exemplary VLC. At 702, an aggregate number of MCUs of the luma component Y is assigned to a variable M, and a variable N is initialized as zero. At 704, Huffman coding is applied to an MCU[N], which is Nth MCU of the luma component Y. At 706, the variable N is incremented.

At 708, a current relationship between the variable M and the variable N is recognized. If the variable N is less than the variable M, Huffman coding is applied to further MCU of the luma component Y. Therefore, the Act 704 is executed again (reference "NO" of Act 708) with the variable N incremented in the Act 706 until the variable N exceeds the variable M. If the variable N exceeds the variable M, the execution of Act 704 with the variable N incremented in the Act 706 is terminated (reference "YES" of Act 708) because all of MCUs of the luma component Y are Huffman coded respectively.

The combination including actions of Act 702 through Act 708, hereinafter termed Y Huffman coding combination 730, are for Huffman coding for MCU of the luma component Y.

At 712, an aggregate number of MCUs of the blue chroma component Cb are assigned to a variable M, and a variable N is initialized as zero. At 714, Huffman coding is applied to an MCU[N], which is Nth MCU of the blue chroma component Cb. At 716, the variable N is incremented.

At 718, a current relationship between the variable M and the variable N is recognized. If the variable N is less than the variable M, Huffman coding is applied to further MCU of the blue chroma component Cb. Therefore, the Act 714 is executed again (reference "NO" of Act 718) with the variable N incremented in the Act 716 until the variable N exceeds the variable M. If the variable N exceeds the variable M, the execution of Act 714 with the variable N incremented in the Act 716 is terminated (reference "YES" of Act 718) because all of MCUs of the blue chroma component Cb are Huffman coded respectively.

The combination including actions of Act 712 through Act 718, hereinafter termed Cb Huffman coding combination 732, are for Huffman coding for MCU of the blue chroma component Cb.

At 722, an aggregate number of MCUs of the red chroma component Cr are assigned to a variable M, and a variable N is initialized as zero. At 724, Huffman coding is applied to an MCU[N], which is Nth MCU of the red chrome component Cr. At 726, the variable N is incremented.

At 728, a current relationship between the variable M and the variable N is recognized if the variable N is less than the variable M, Huffman coding is applied to further MCU of the red chrome component Cr. Therefore, the Act 724 is executed again (reference "NO" of Act 728) with the variable N incremented in the Act 726 until the variable N exceeds the variable M. If the variable N exceeds the variable M, the execution of Act 724 with the variable N incremented in the Act 726 is terminated (reference "YES" of Act 728) because all of MCUs of the red chrome component Cr are Huffman coded respectively.

The combination including actions of Act 722 through Act 728, hereinafter termed Cr Huffman coding combination 734, are for Huffman coding for MCU of the red chroma component Cr. As all of MCUs of the all components are Huffman coded respectively, the VLC 518 is finished.

The Y Huffman coding combination 730, the Cb Huffman coding combination 732 and the Cr Huffman coding combination 734 have no dependency with each other. Therefore, the Y Huffman coding combination 730, the Cb Huffman coding combination 732 and the Cr Huffman coding combination 734 are able to be processed respectively as independent processes. For example, the Y Huffman coding combination 730, the Cb Huffman coding combination 732 and the Cr Huffman coding combination 734 may be processed such that the Y Huffman coding combination 730 is processed as a process A by a processor, the Cb Huffman coding combination 732 is processed as a process B existing simultaneously with the process A for the processor at the same or different time, and the Cr Huffman coding combination 734 is processed as a process C existing simultaneously with the process A and the process B for the processor at the same or different time.

If a processing system for executing those of the Y Huffman coding combination 730, the Cb Huffman coding combination 732 and the Cr Huffman coding combination 734 includes a multiprocessor, the processes may be distributed over the multiprocessor such that the Y Huffman coding combination 730 is processed as a process A by a processor A, the Cb Huffman coding combination 732 is processed by a processor B as a process B existing simultaneously with the process A at the same or different time, and the Cr Huffman coding combination 734 is processed by a processor C as a process C existing simultaneously with the process A and the process B at the same or different time. Here, the multiprocessor may mean a system including a plurality of processors, one or more processors having a plurality of cores or co-processing elements, or other equivalent arrangements.

Additionally, the Y Huffman coding combination 730, the Cb Huffman coding combination 732 and the Cr Huffman coding combination 734 are able to be processed respectively as independent tasks. For example, the Y Huffman coding combination 730, the Cb Huffman coding combination 732 and the Cr Huffman coding combination 734 may be processed according to a so called a multi-tasking operation system such that the Y Huffman coding combination 730 is processed as a task A, the Cb Huffman coding combination 732 is processed as a task B existing simultaneously with the task A at the same or different time, and the Cr Huffman coding combination 734 is processed as a task C existing simultaneously with the task A and the task B at the same or different time.

Moreover, the Y Huffman coding combination 730, the Cb Huffman coding combination 732 and the Cr Huffman coding combination 734 are able to be distributed over the processes and the tasks to balance the processes and the tasks. For example, when the 4:1:1 subsampling ratio is applied in the Act 504, half the number of all of the MCUs of the luma component Y may be processed as a process A or a task A, all of MCUs of the blue chroma component Cb and residual one fourth of all of the MCUs of the luma component Y may be processed as a process B or a task B, and all of MCUs of the red chroma component Cr and the further residual one fourth of all of the MCUs of the luma component Y may be processed as a process C or a task C.

The exemplary implementation of the VLC 518 is described above. Hereinafter, a first exemplary implementation of the Huffman coding compatibly that can be utilized for the Acts 704, 714 and 724 is described in particular with reference to FIGS. 7 through 11.

(1-3) First Exemplary Huffman Coding

Figure 7:
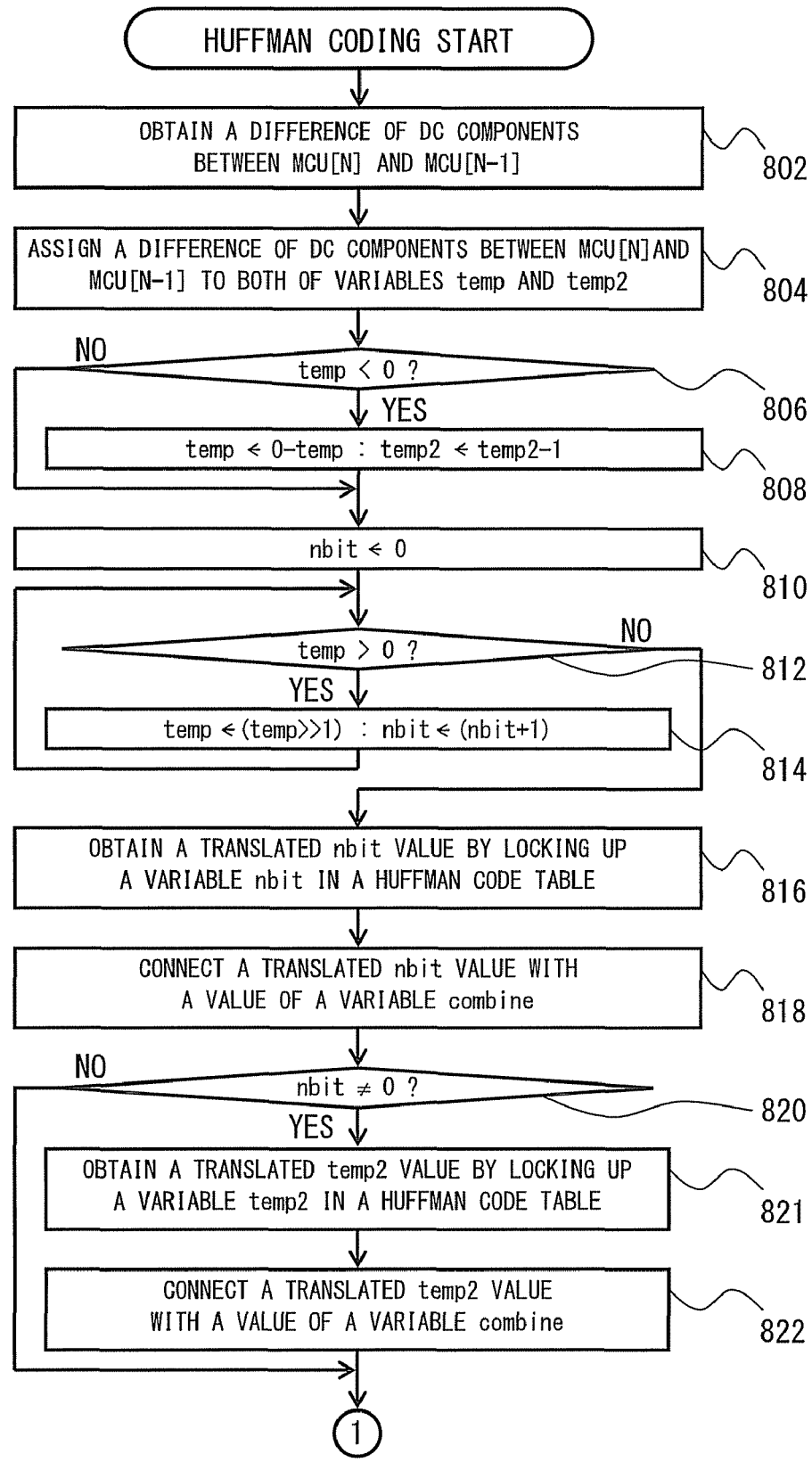
FIG. 7 is a flowchart illustrating a first part of a first exemplary Huffman coding.

FIG. 7 illustrates a first partial flowchart of the first exemplary Huffman coding. At 802, a difference of DC components between MCU[N] and MCU[N-1] is obtained. If the variable N is zero, zero is used as the DC components of the MCU[N-1]. At 804, the difference of dc components between MCU[N] and MCU[N-1] is assigned to both of variables temp and temp2.

At 806, the variable temp is compared with zero. If the variable temp is smaller than zero (reference "YES" of Act 806), a result of a calculation 0-temp is newly assigned to the variable temp. In addition, a value of the variable temp2 is decremented at 808. Otherwise (reference "NO" of Act 806), the act 808 is not executed.

At 810, zero is assigned to a variable nbit. At 812, the variable temp is compared with zero. If the variable temp is greater than zero (reference "YES" of Act 812), a value of the variable temp is shifted by one bit to the right and a value of the variable nbit is incremented at 814 and the act 812 is executed again. Otherwise (reference "NO" of Act 812), the loop including the act 812 and the act 814 is finished. That is, the value of the variable temp is shifted to the right until the value of the variable temp reaches zero with incrementing the value of the variable nbit. Therefore, the value of the variable nbit means a number of significant digits of the difference of DC components between MCU[N] and MCU[N-1].

For example after proceeding to the reference "NO" of the act 812, when the difference of DC components between MCU[N] and MCU[N-1] is ten, the variable temp may be ten, the variable temp2 may be ten, the variable nbit may be four and a significant digit of the variable temp2 may be 1010 in a binary number. When the difference of DC components between MCU[N] and MCU[N-1] is thirty two, the variable temp may be thirty two, the variable temp2 may be thirty two, the variable nbit may be five and a significant digit of the variable temp2 may be 10000 in a binary number. When the difference of DC components between MCU[N] and MCU[N-1] is minus three, the variable temp may be three, the variable temp2 may be minus four, the variable nbit may be two and a significant digit of the variable temp2 may be 00 in a binary number.

At 816, a translated nbit value is obtained by looking up the value of the variable nbit in a huffman code table. At 818, the translated nbit value is connected with a left side of a value of a variable combine. At 820, the variable nbit is compared with zero. If the variable nbit is not equal to zero (reference "YES" of Act 820), a translated temp2 value is obtained by looking up the value of the variable temp2 in a huffman code table at 821, and the translated temp2 value is connected with a left side of a value of the variable combine at 822. Otherwise (reference "NO" of Act 820), the act 821 and the act 822 are not executed. A circular terminal given a numeral "1" on bottom of the flowchart in FIG. 7 continues to a terminal given the same number on top of a flowchart in FIG. 8.

Figure 8:
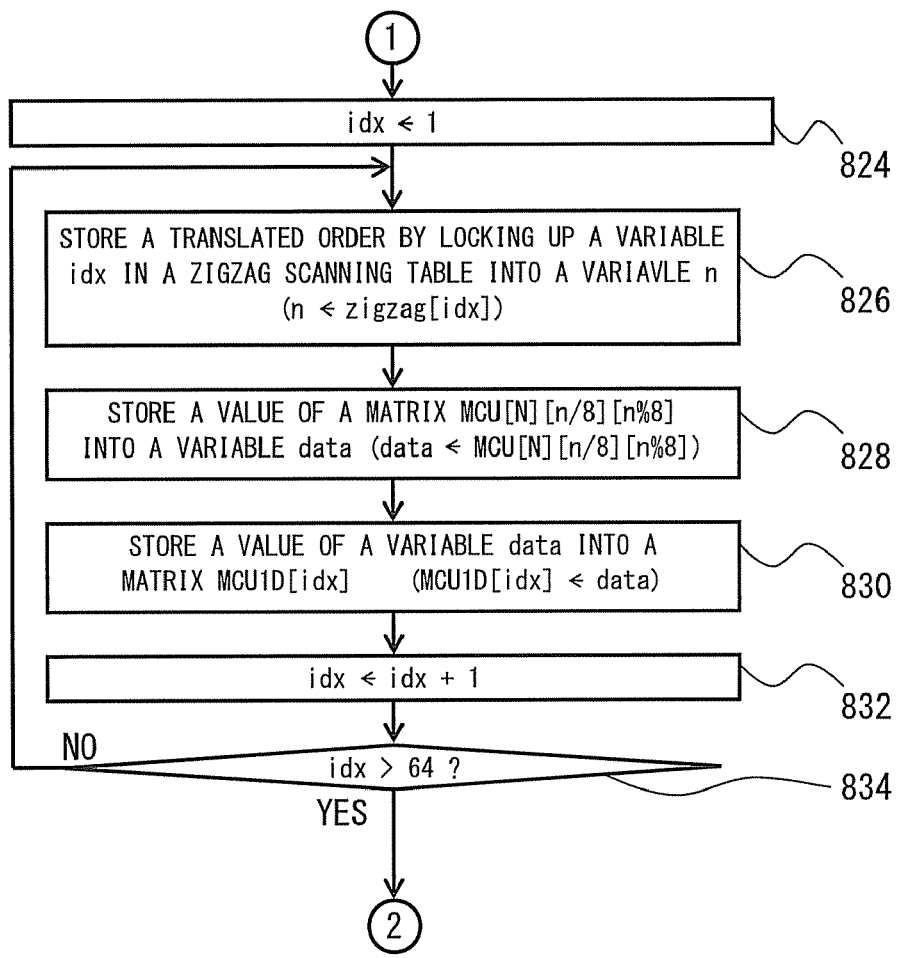
FIG. 8 is a flowchart illustrating a second part of a first exemplary Huffman coding.

FIG. 8 illustrates a second partial flowchart of the exemplary Huffman coding. After the act 820 or the act 822, zero is assigned to a variable idx at 824.

At 826, a translated order is obtained by looking up the value of the variable idx in a zigzag scanning table and the translated order is assigned to a variable n. The zigzag scanning table is a one dimensional matrix containing numbers from one to sixty three in order of the zigzag scanning corresponding to incremental real numbers from one to sixty three as index.

At 828 a value at [n/8] in row and [n%8] in column of the two dimensional matrix MCU[N] is assigned to a variable data. The [n/8] means a quotient between n as a divided and 8 as a divisor. The [n%8] means a remainder between n as a divided and 8 as a divisor. At 830, the value of the variable data is assigned to a one dimensional matrix MCU1D[idx]. At 832, the variable idx is incremented.

At 834, the variable idx is compared with sixty four. If the variable idx is not greater than sixty four (reference "NO" of Act 834), the act 826 is executed again. Otherwise (reference "YES" of Act 834), the loop including the act 826 through the act 832 is finished. That is, the sixty three AC components in the two dimensional matrix MCU[N] are transferred into the one dimensional matrix MCU1D according to the order stored in the zigzag scanning table. A circular terminal given a numeral "2" on bottom of the flowchart in FIG. 8 continues to a terminal given the same number on top of a flowchart in FIG. 9.

Figure 9:
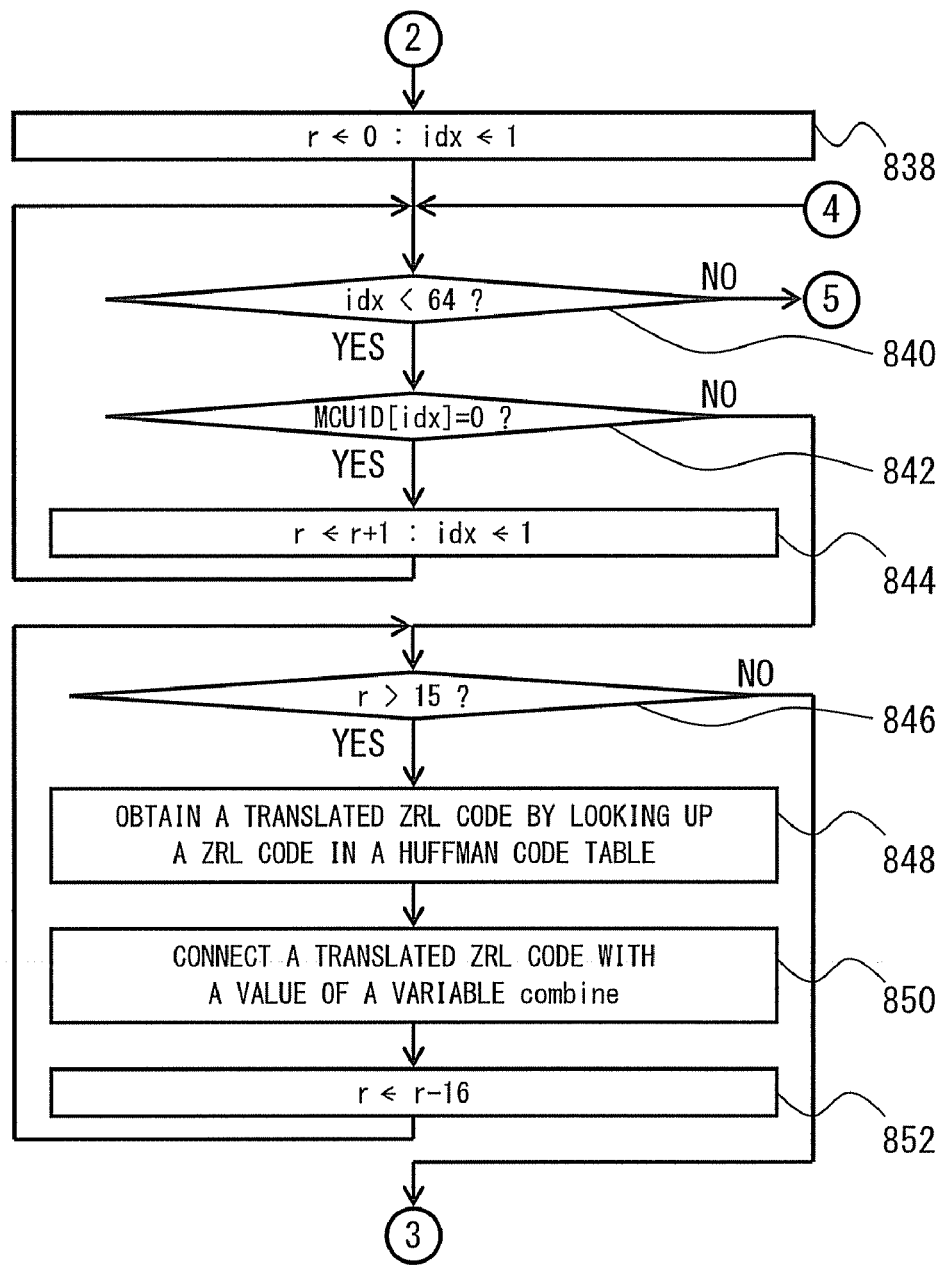
FIG. 9 is a flowchart illustrating a third part of a first exemplary Huffman coding.

FIG. 9 illustrates a third partial flowchart of the exemplary Huffman coding. After the act 834, zero is assigned to the variable r and one is assigned to a variable idx at 838.

At 840, the variable idx is compared with sixty four. If the variable idx is smaller than sixty four (reference "YES" of Act 840), the value of the one dimensional matrix MCU1D[idx] is compared with zero at 842. If the one dimensional matrix MCU1D[idx] is equal to zero (reference "YES" of Act 842), the value of the variable r is incremented and one is assigned to the variable idx at 844, and the act 840 is executed again.

If the one dimensional matrix MCU1D[idx] is not equal to zero (reference "NO" of Act 842), the loop including the act 844 and the act 840 is finished and the variable r is compared with fifteen at 846. If the variable r is greater than fifteen (reference "YES" of Act 846), a translated ZRL code is obtained by looking up the ZRL code in the huffman code table at 848.

At 850, the translated ZRL code is connected with the value of the variable combine. At 852, sixteen is subtracted from the value of the variable r, and the act 846 is executed again.

Figure 10:
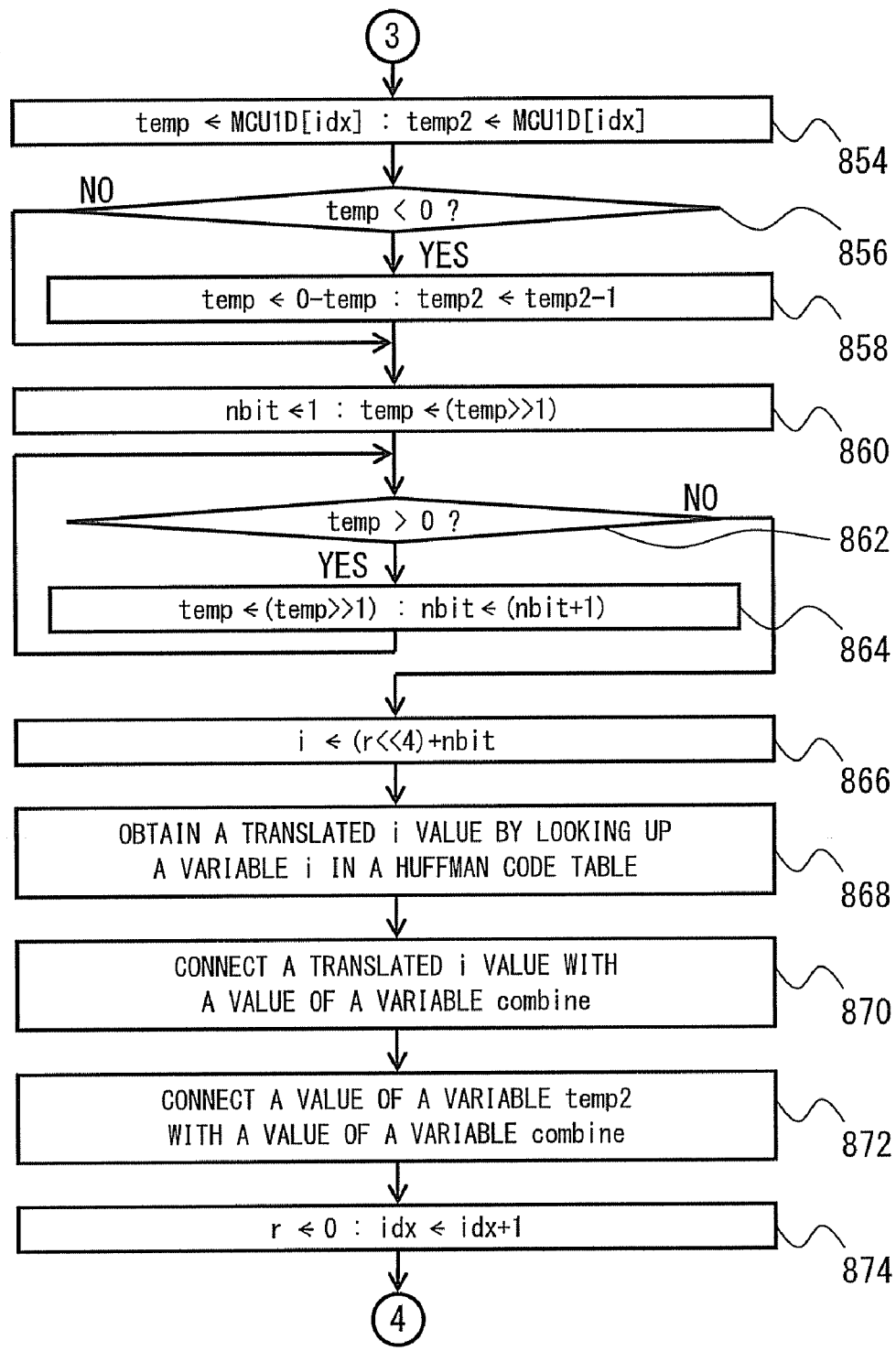
FIG. 10 is a flowchart illustrating a fourth part of a first exemplary Huffman coding.

If the variable r is not greater than fifteen at the act 846 (reference "NO" of Act 846), the loop including the act 848 through the act 852 is finished and then the Huffman coding continues to a circular terminal given a numeral "3" on bottom of the flowchart in FIG. 9 which continues to a terminal given the same number on top of a flowchart in FIG. 10. That is, sixteen zero data continuing in the one dimensional matrix MCU1D is substituted for the ZRL code, the ZRL code is Huffman-coded and connected with the value of the variable combine.

FIG. 10 illustrates a fourth partial flowchart of the exemplary Huffman coding. After the act 854, the value of the variable MCU1D[idx] is assigned to both of the variables temp and temp2 at 854.

At 856, the variable temp is compared with zero. If the variable temp is smaller than zero (reference "YES" of Act 856), a result of a calculation 0-temp is newly assigned to the variable temp. In addition, a value of the variable temp2 is decremented at 858. Otherwise (reference "NO" of Act 856), the act 858 is not executed.

At 860, one is assigned to a variable nbit and the value of the variable temp is shifted by one bit to the right.

At 862, the variable temp is compared with zero. If the variable temp is greater than zero (reference "YES" of Act 862), a value of the variable temp is shifted by one bit to the right and a value of the variable nbit is incremented at 864 and the act 862 is executed again. Otherwise (reference "NO" of Act 862), the loop including the act 862 and the act 864 is finished. That is, the value of the variable temp is shifted to right until the value of the variable temp reaches zero with incrementing the value of the variable nbit. Therefore, the value of the variable nbit means a number of significant digit of the AC component stored in the one dimensional matrix MCU1D[idx].

At 866, a result of a calculation where the value of the variable r is shifted by four bits to the left and added the value of the variable nbit is assigned to a variable i. That is, the value of the variable nbit is added after the value of the variable r is multiplied by sixteen in decimal number.

At 868, a translated i value is obtained by looking up the variable i in the huffman code table.

At 870, the translated i value is connected with a left side of the value of the variable combine.

Act 872, the value of the variable temp2 is connected with a left side, which is the left side of the translated i value connected in the act 870, of the value of the variable combine.

At 874, zero is assigned to the variable r and the variable idx is incremented.

A circular terminal given a numeral "4" on bottom of the flowchart in FIG. 10 continues to a terminal given the same number connecting between the act 838 and 840 of the flowchart in FIG. 9.

Figure 11:
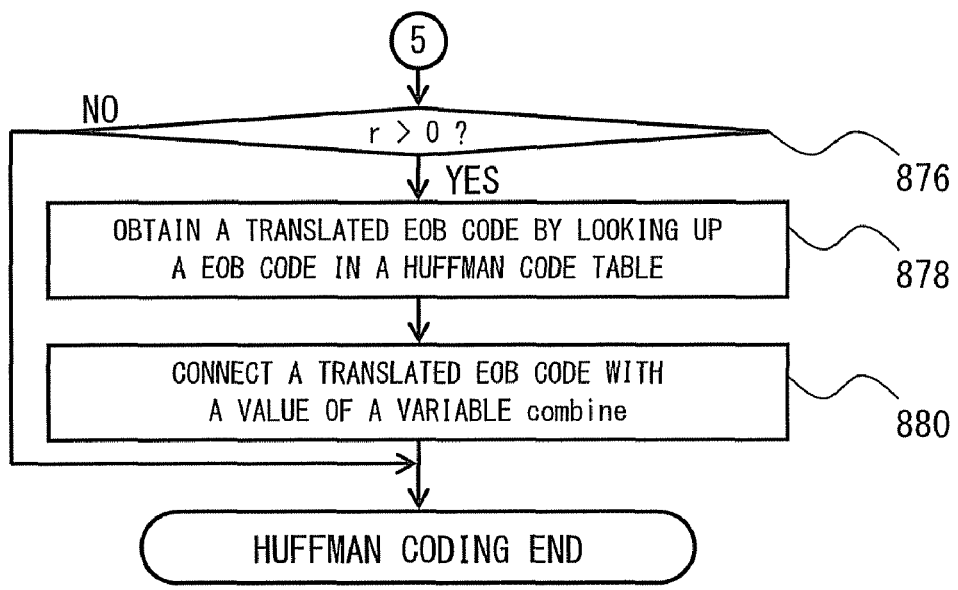
FIG. 11 is a flowchart illustrating a fifth part of a first exemplary Huffman coding.

If the variable idx is not smaller than sixty four at the act 840 (reference "NO" of Act 840), the loop including the act 842 through the act 844 is finished and the Huffman coding continues to a circular terminal given a numeral "5" on right of the act 840 in the flowchart in FIG. 9 which continues to a terminal given the same number on top of a flowchart in FIG. 11.

FIG. 11 illustrates a fifth partial flowchart of the exemplary Huffman coding. After the variable idx is determined as less than sixty four in the act 840, the value of the variable r is compared with zero at 876. If the value of the variable r is greater than zero (reference "YES" of Act 876), a translated EOB code is obtained by looking up the EOB code in the Huffman code table at 878.

At 880, the translated EOB code is connected with a left side of the value of the variable combine and the Huffman coding ends. If the value of the variable r is not greater than zero (reference "NO" of Act 876), the Huffman coding finishes without executing the act 878 and the act 880.

(1-4) Second Exemplary Huffman Coding (1-4-1) Exemplary SIMD Instructions

Exemplary SIMD Instructions are described below for preparing to describe a second exemplary Huffman coding. The SIMD instructions are explained as including, but not limited to, processing on data in unit of a register. The SIMD instructions can alternatively be applied to a larger entity of data such as data processed in unit of a processor including a plurality of registers or data processed in unit of a computing machine available for communicating through a network as well as an independent operation.

(1-4-1-1) "Load" Instruction

Figure 12:
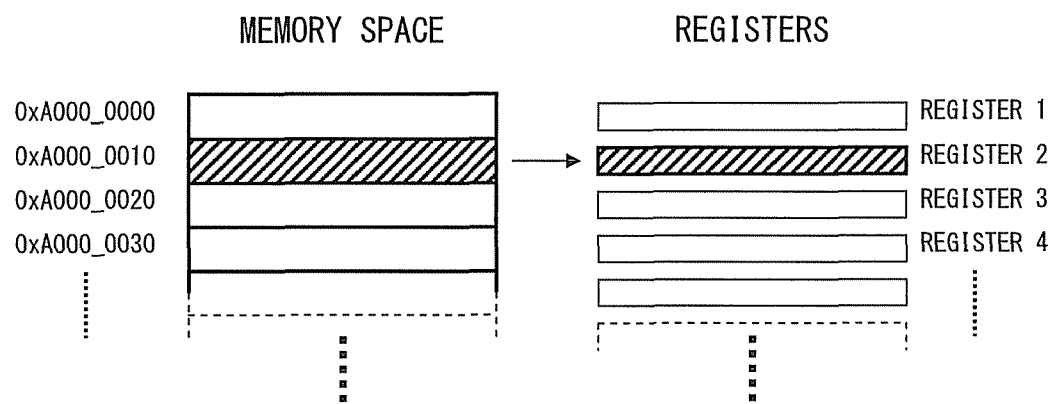
FIG. 12 is a conceptual diagram illustrating an operation on a memory space and registers according to a "Load" instruction.

The "Load" instruction means to load data from a memory space to a register. The data is loaded from an address in the memory space, wherein the address may be specified with the instruction. Both the register for loading of the data and a length of the data may be specified with the instruction, also. FIG. 12 illustrates an exemplary conceptual diagram indicating an operation on the memory space and registers according to the "Load" instruction. In this figure, data stored in an address which continues from 0xA000_0010 in the memory space is loaded into a register 2 in unit of length of the register 2. The memory space may store the data aligned to addresses divisible by the length of the registers. Generally speaking, the length of the register may be any suitable number of bits, such as 8, 16, 32, 64 or 128 bits depending on the specific kind of processor.

(1-4-1-2) "Shuffle" Instruction

The "Shuffle" instruction means to assign data of an original register to a subject register in order of numbers stored in a reference register. The original register, the subject register and the reference register may be a single register or a plurality of registers. The "Shuffle" instruction associates an order of elements in the reference register (hereinafter referred to as "reference element order") with an order of elements in the subject register (hereinafter referred to as "subject element order"), and associates a number stored in each element in the reference register (hereinafter referred to as "original element number") with elements in the original register, also. Size of the elements may depend on a variant type associated with the original register or the reference register.

Figure 13:
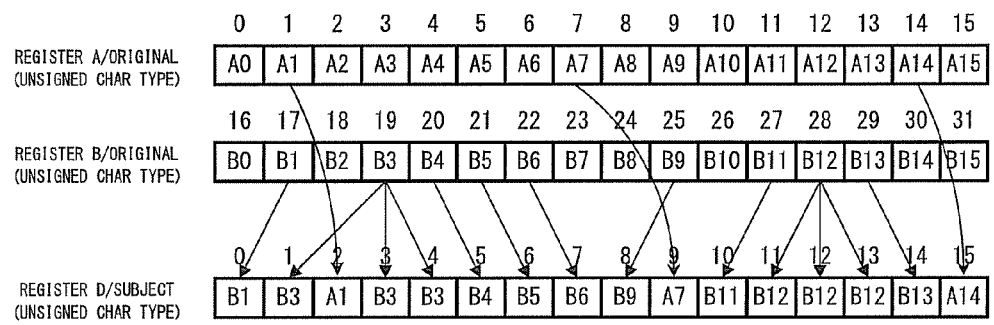
FIG. 13 is a conceptual diagram illustrating an operation on registers according to a "Shuffle" instruction.
Figure 13:
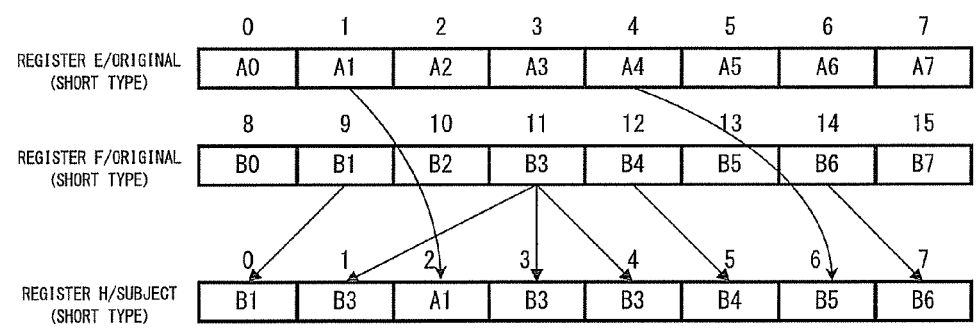

FIG. 13 illustrates an exemplary conceptual diagram indicating an operation on registers according to the "Shuffle" instruction. In this figure, all registers have a 128 bit length, although any bit length can be employed. A register A, a register B, a register C and a register D are associated with unsigned char type variants which have an 8 bit length. On the other hand, a register E, a register F, a register G and a register H are associated with short type variants which have a 16 bit length.

If the "Shuffle" instruction designates the register A and the register B as an original registers, the register C as a reference register, and the register D as a subject register, an element which is associated with an element number "0" in a register C stores a number "17", wherein "0" is either the reference element order or the subject element order and "17" is the original element number. An element associated with the original element number "17" among registers A and B stores data B1. Therefore, an element which is associated with an element number "0" in a register D obtains the data B1. In the same manner, an element which is associated with an element number "9" in the subject register obtains the data A7 because an element which is associated with an element number "9" in the reference register stores "7" as the original element number, and an element which is associated with an element number "15" in the subject register obtains the data A14 because an element which is associated with an element number "15" in the reference register stores "14" as the original element number.

If the "Shuffle" instruction designates the register E and the register F as original registers, the register G as a reference register, and the register H as a subject register, an element which is associated with an element number "0" in a register G stores a number "9", wherein "0" is either the reference element order or the subject element order and "9" is the original element number. An element associated with the original element number "9" among registers E and F stores data B1. Therefore, an element which is associated with an element number "0" in a register H obtains the data B1. In the same manner, an element which is associated with an element number "4" in the subject register obtains the data B3 because an element which is associated with an element number "4" in the reference register stores "11" as the original element number.

(1-4-1-3) "Cmpgt" Instruction

The "Cmpgt" instruction means to assign results of comparisons between a plurality of data stored in an original register and a plurality of data stored in a reference register to a subject register. Each element in the original register (hereinafter the element referred to as "original element") is compared with an element which is in the same position as the original element in the reference register (hereinafter the element referred to as "reference element"). A result of the comparison between the original element and the reference element is assigned to an element which is in the same position as the original element in the subject register (hereinafter the element referred to as "subject element"). The comparison for all of the original elements and the reference elements can be held at the same time according to single "Cmpgt" instruction. If the original element stores a greater value than a value stored in the reference element, a value "0xFF" is assigned to the subject element. Otherwise, a value "0x00" is assigned to the subject element. Size of elements may depend on a variant type associated with the original register.

Figure 14:
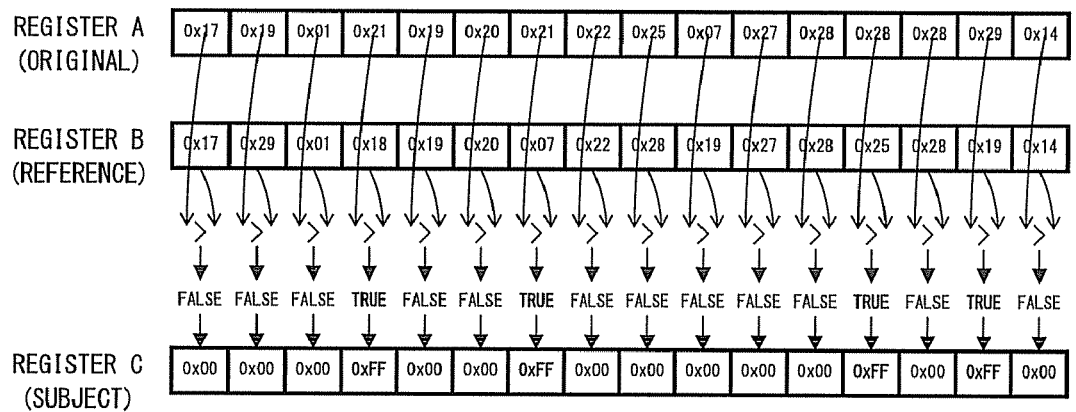
FIG. 14 is a conceptual diagram illustrating an operation on registers according to a "Cmpgt" instruction.

FIG. 14 illustrates an exemplary conceptual diagram indicating an operation on registers according to the "Cmpgt" instruction. In this figure, a first element counted from a left side in a register A as the original element stores a value "0x17". A first element counted from a left side in a register B as the reference element also stores a value "0x17". Therefore, a value "0x00" is assigned to a first subject element which is counted from a left side in the subject register since the comparison for first elements provides a false result. In the same manner, a fourth element counted from a left side in a register A as the original element stores a value "0x21". A fourth element counted from a left side in a register B as the reference element also stores a value "0x18". Therefore, a value "0xFF" is assigned to a fourth subject element which is counted from a left side in the subject register since the comparison for fourth elements provides a true result. Still further, a ninth element counted from a left side in a register A as the original element stores a value "0x25". A ninth element counted from a left side in a register B as the reference element also stores a value "0x28". Therefore, a value "0x00" is assigned to a ninth subject element which is counted from a left side in the subject register since the comparison for ninth elements provides a false result.

(1-4-1-4) "Cmpeq" Instruction

The "Cmpeq" instruction means to assign results of comparisons between a plurality of data stored in an original register and a plurality of data stored in a reference register to a subject register. Each element in the original register (hereinafter the element referred to as "original element") is compared with an element which is in the same position as the original element in the reference register (hereinafter the element referred to as "reference element"). A result of the comparison between the original element and the reference element is assigned to an element which is in the same position as the original element in the subject register (hereinafter the element referred to as "subject element"). The comparison for all of the original elements and the reference elements can be held at the same time according to single "Cmpeq" instruction. If the original element stores an equal value to a value stored in the reference element, a value "0xFF" is assigned to the subject element. Otherwise, a value "0x00" is assigned to the subject element. The value of the elements may be in unit of bytes.

Figure 15:
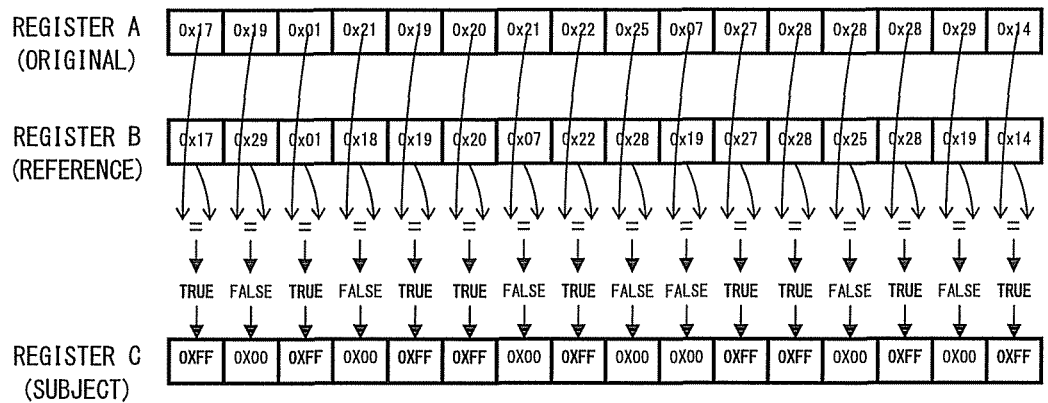
FIG. 15 is a conceptual diagram illustrating an operation on registers according to a "Cmpeq" instruction.

FIG. 15 illustrates an exemplary conceptual diagram indicating an operation on registers according to the "Cmpeq" instruction. In this figure, a first element counted from a left side in a register A as the original element stores a value "0x17". A first element counted from a left side in a register B as the reference element also stores a value "0x17". Therefore, a value "0xFF" is assigned to a first subject element which is counted from a left side in the subject register since the comparison for first elements provides a true result. In the same manner, a fourth element counted from a left side in a register A as the original element stores a value "0x21". A fourth element counted from a left side in a register B as the reference element also stores a value "0x18". Therefore, a value "0x00" is assigned to a fourth subject element which is counted from a left side in the subject register since the comparison for fourth elements provides a false result. Yet, a fifteenth element counted from a left side in a register A as the original element stores a value "0x29". A fifteenth element counted from a left side in a register B as the reference element also stores a value "0x19". Therefore, a value "0x00" is assigned to a fifteenth subject element which is counted from a left side in the subject register since the comparison for fifteenth elements provides a false result.

(1-4-1-5) "Select" Instruction

The "Shuffle" instruction means to assign data of a primary original register or a secondary original register to a subject register. Values stored in a reference register define which of the primary original register or a secondary original register is selected. Each element in the reference register (hereinafter the element referred to as "reference element") defines which element in the primary original register or a secondary original register in the same position as the reference element (hereinafter the elements referred to as "primary original element" and "secondary original element", respectively) is selected. A value stored in an element selected from the primary original element or the secondary original element is assigned to an element which is in the same position as the reference element in the subject register (hereinafter the element referred to as "subject element"). Such selection and storage action for all of elements can be held at the same time or at different times according to single "Select" instruction. If the reference element stores a value "0xFF", a value of the primary original register is assigned to the subject element. If the reference element stores a value "0x00", a value of the secondary original register is assigned to the subject element. The value of the elements may be in unit of bytes.

Figure 16:
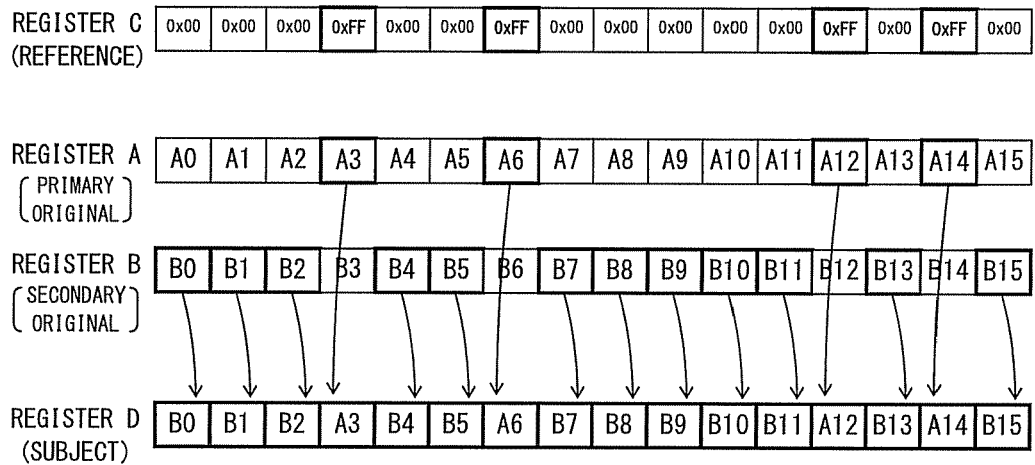
FIG. 16 is a conceptual diagram illustrating an operation on registers according to a "Select" instruction.

FIG. 16 illustrates an exemplary conceptual diagram indicating an operation on registers according to the "Select" instruction. In this figure, a first element counted from a left side in a register A as the primary original element stores a value A0. A first element counted from a left side in a register B as the secondary original element stores a value B0. A first element counted from a left side in a register C as the reference element stores a value "0x00". Therefore, a value B1 is assigned to a first subject element which is counted from a left side in a register D as the subject register since the secondary original element is selected. As same manner, a sixth element counted from a left side in a register A as the primary original element stores a value A6. A sixth element counted from a left side in a register B as the secondary original element stores a value B6. A sixth element counted from a left side in a register C as the reference element stores a value "0xFF". Therefore, a value A6 is assigned to a sixth subject element which is counted from a left side in a register D as the subject register since the primary original element is selected.

(1-4-1-6) "Add" Instruction

The "Add" instruction means to assign an addition of values stored in two original registers to a subject register. Each element of the subject register (hereinafter the element referred to as "subject element") is assigned an addition of values in each element in the same position as the subject element in the two original registers (hereinafter the elements referred to as "original element", respectively). The value of the elements may be in unit of bytes.

Figure 17:
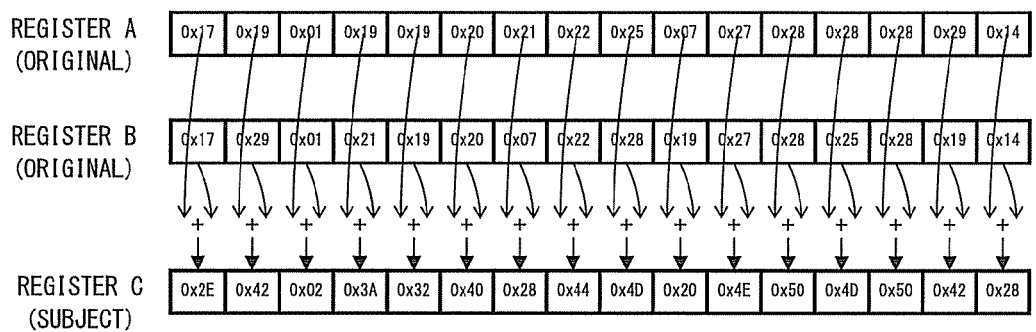
FIG. 17 is a conceptual diagram illustrating an operation on registers according to an "Add" instruction.

FIG. 17 illustrates an exemplary conceptual diagram indicating an operation on registers according to the "Add" instruction. In this figure, a first element counted from a left side in a register A as one of the original elements stores a value "0x17". A first element counted from a left side in a register B as the other of the original elements stores a value "0x17". Therefore, a value "0x2E" which is an addition of the values of the original elements is assigned to a subject element that is a first element counted from a left side in a register D as the subject register. In the same manner, a tenth element counted from a left side in a register A as one of the original elements stores a value "0x07". A tenth element counted from a left side in a register B as the other of the original elements stores a value "0x19". Therefore, a value "0x20" which is an addition of the values of the original elements is assigned to a subject element that is a tenth element counted from a left side in a register D as the subject register.

(1-4-1-7) "Sub" Instruction

The "Sub" instruction means to assign a difference between a minuend original register and a subtrahend original register to a subject register. Each element of the subject register (hereinafter the element referred to as "subject element") is assigned a difference between a value in an element in the same position as the subject element in the minuend original register (hereinafter the element referred to as "minuend element") and a value in an element in the same position as the subject element in the subtrahend original register (hereinafter the element referred to as "subtrahend element"). The value of the elements may be in unit of bytes.

Figure 18:
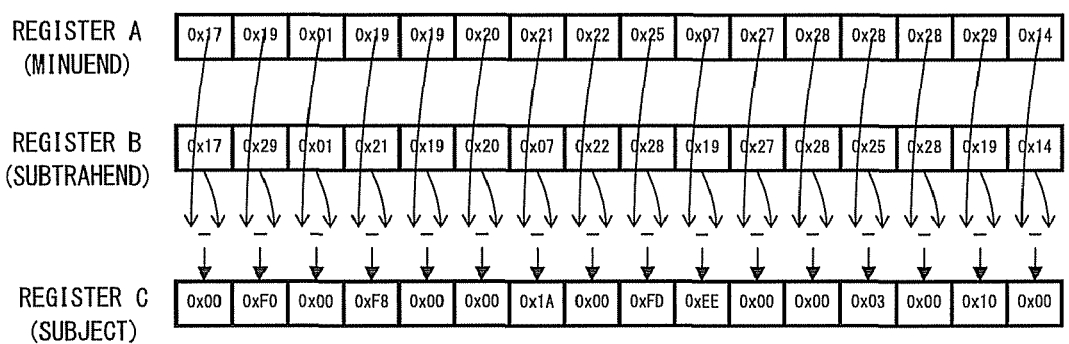
FIG. 18 is a conceptual diagram illustrating an operation on registers according to a "Sub" instruction.

FIG. 18 illustrates an exemplary conceptual diagram indicating an operation on registers according to the "Sub" instruction. In this figure, a first element counted from a left side in a register A as the minuend element stores a value "0x17". A first element counted from a left side in a register B as the subtrahend element stores a value "0x17". Therefore, a value "0x00" which is a difference between the value of the minuend element and the value of the subtrahend element is assigned to a subject element that is a first element counted from a left side in a register D as the subject register. In the same manner, a tenth element counted from a left side in a register A as the minuend element stores a value "0x07". A tenth element counted from a left side in a register B as the subtrahend element stores a value "0x19". Therefore, a value "0xEE" which is a difference between the value of the minuend element and the value of the subtrahend element is assigned to a subject element that is a tenth element counted from a left side in a register D as the subject register.

(1-4-1-8) "Shift" Instruction

The "Shift" instruction means to assign a shifted bit sequence to a subject register, wherein the shifted bit sequence is shifted from a bit sequence in an original register to the left according to a number specified in a reference register. One or more bits shifted out to the left side of the bit sequence are discarded. The deficit of the one or more bits on the right side of the bit sequence may be filled with zero. The bit sequence may be, but not limited to, shifted by a unit of 8 bits. The number in the reference register may specify a number of the unit. The number may be represented by significant bits in the reference register. A length of the significant bits is X bits. The significant bits may be counted from (Y+1)th bit from the right end toward the left. The X may be 3 and the Y may be 3 that means the significant bits are from 24th bit to 28th bit in an integer type variant, but both of the X and the Y, as well as other instructions described in this specification, depend on an instruction implementation on a processor. X and Y are independently integers.

Figure 19:
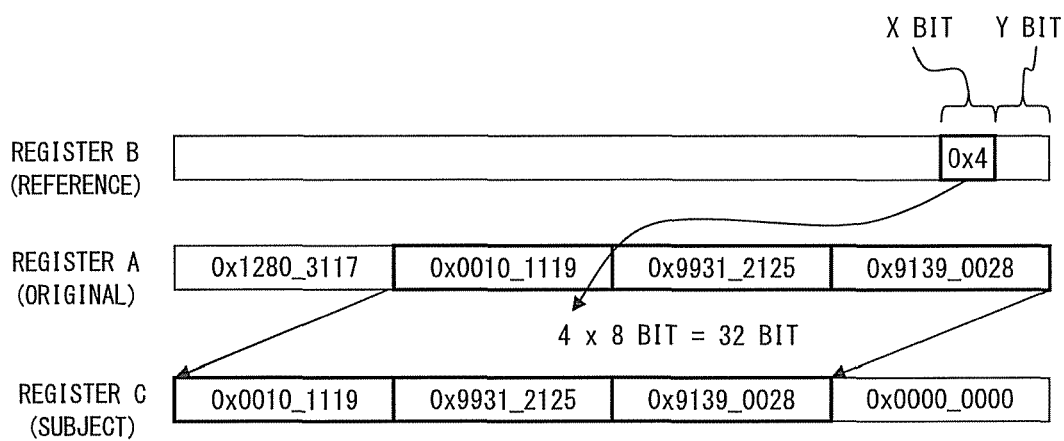
FIG. 19 is a conceptual diagram illustrating an operation on registers according to a "Shift" instruction.

FIG. 19 illustrates an exemplary conceptual diagram indicating an operation on registers according to the "Shift" instruction. In this figure, a register A as the original register stores a 128 bit value "0x1280_3117_0010_1119_9931_2125_9139_0028", wherein "_" is used just for ease in recognizing a unit of 8 bits. A register B as the reference register stores "0x4" as the significant bits. Therefore, a register C as the subject register is assigned a 128 bit value "0x3117_0010_1119_9931_2125_9139_0028_0000" where 4 bits which represent "0x1280_3117" at the left end of the bit sequence is discarded, 5th to 16th bits counted form the left end to the right is shifted as 1st to 12th bits, and 4 bits on the right end are filled with zero, comparing with the 128 bit value stored in the register A.

(1-4-1-9) "Gather" Instruction

The "Gather" instruction means to assign a value gathered from LSBs (Least Significant Bits) of each unit in an original register to a subject register. Values of each LSB in the original register may be gathered into right side in the subject register. Residual bits in the subject register may be filled with zero. Each unit in the original register may be termed a slot. Size of the slots may depend on a variant type associated with the original register. Therefore, a number of LSB gathered to the subject register changes depending on a variant type associated with the original register.

Figure 20:
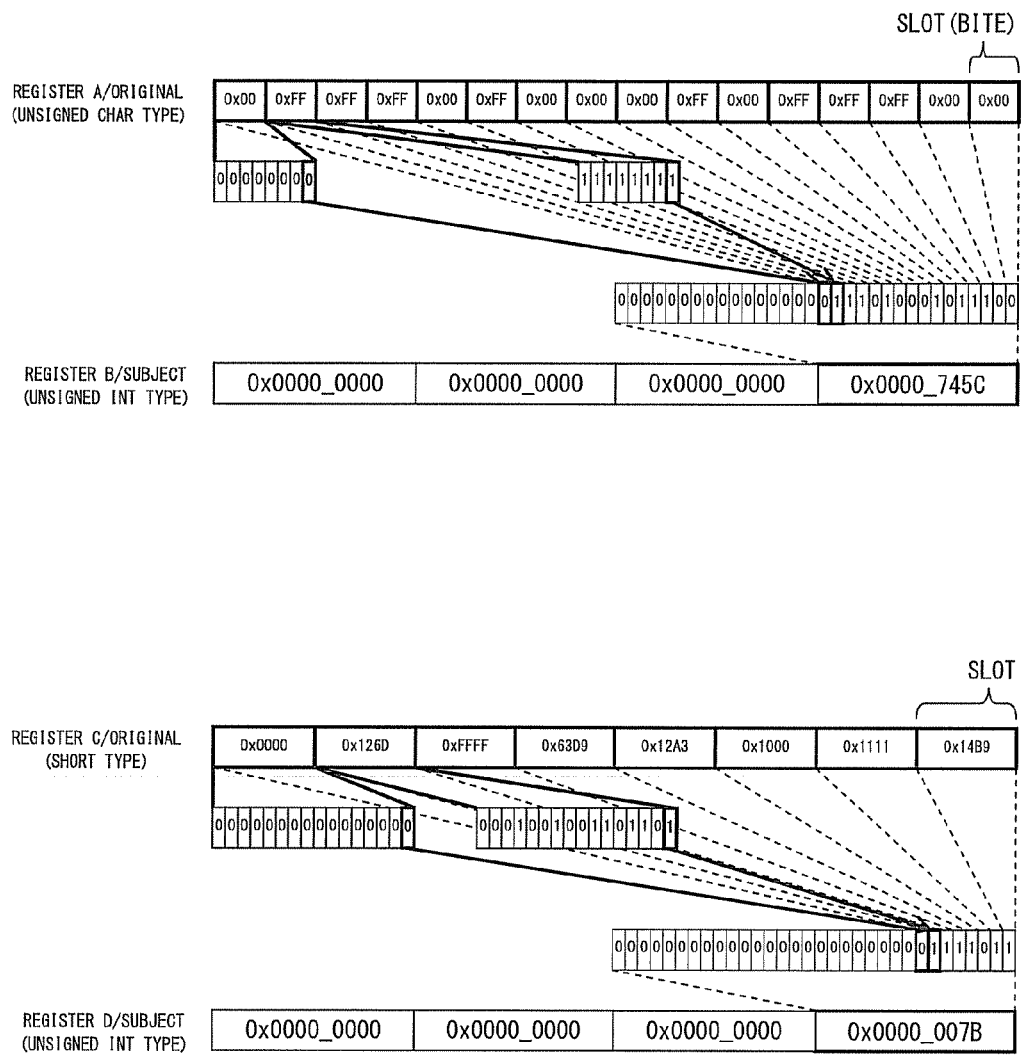
FIG. 20 is a conceptual diagram illustrating an operation on registers according to a "Gather" instruction.

FIG. 20 illustrates an exemplary conceptual diagram indicating an operation on registers according to the "Gather" instruction. In this figure, all registers have a 128 bit length. A register A is associated with unsigned char type variants which have an 8 bit length. A register C is associated with short type variants which have a 16 bit length. A register B and a register D are associated with unsigned integer type variants which have a 32 bit length.

If the "Gather" instruction designates the register A as an original register and the register B as a subject register, the original register stores 16 values in unit of bytes. A first byte counted from the left in the original register represents a value "0x00" the right end bit of which is "0". The right end bit of the first byte in the original register is employed as a first bit of a gathered value. A second byte counted from the left in the original register represents a value "0xFF" the right end bit of which is "1". The right end bit of the second byte in the original register is employed as a second bit of the gathered value. In the same manner, each right end bit of each 16 slots in the original register is collected in order of bytes in the original register into the gathered value. In accordance with the register A in FIG. 20, the gathered value is "0111010001011100B" (i.e. "0x0000745C"). The gathered value is stored as right side in the subject register. Residual bits in the subject register are assigned zero. Therefore, finally the register B represents "0x0000_0000" in first, second and third 32 bytes, and "0x0000745C" in fourth 32 bytes.

If the "Gather" instruction designates the register C as an original register and the register D as a subject register, the original register stores 8 values in unit of slots. A first slot counted from the left in the original register represents a value "0x0000" the right end bit of which is "0". The right end bit of the first slot in the original register is employed as a first bit of a gathered value. A second slot counted from the left in the original register represents a value "0x126D" the right end bit of which is "1". The right end bit of the second slot in the original register is employed as a second bit of the gathered value. As same manner, each right end bit of each 8 slots in the original register is collected in order of slots in the original register into the gathered value. In accordance with the register C in FIG. 20, the gathered value is "01111011B" (i.e. "0x0000007B"). The gathered value is stored as right side in the subject register. Residual bits in the subject register are assigned zero. Therefore, finally the register D represents "0x0000_0000" in first, second and third 32 bytes, and "0x0000007B" in fourth 32 bytes.

(1-4-1-10) "Cntlz" Instruction

The "Cntlz" instruction means to assign numbers of bits representing "0B" on the left side of a first bit representing "1B" counted from a left end bit of each counting unit in an original register to each counting unit in a subject register. The left end may be termed MSB (Most Significant Bit). Each counting unit may be, but not limited to, 32 bits and termed a slot of an integer type variable.

Figure 21:
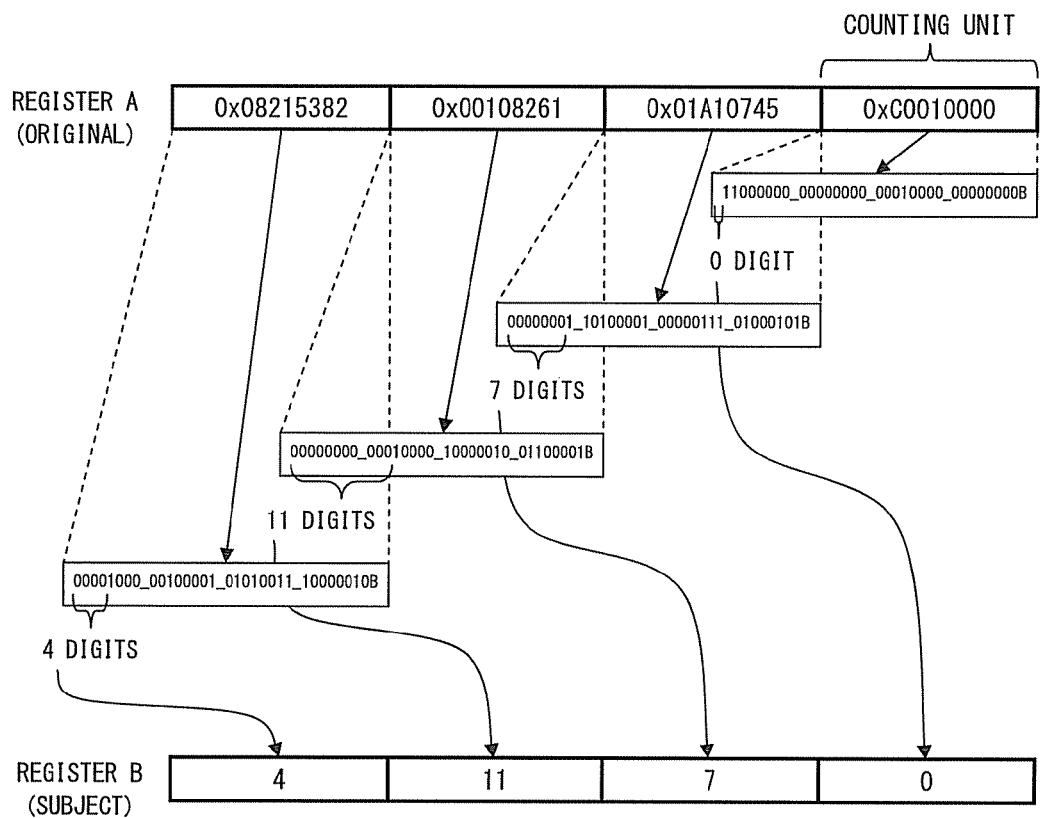
FIG. 21 is a conceptual diagram illustrating an operation on registers according to a "Cntlz" instruction.

FIG. 21 illustrates an exemplary conceptual diagram indicating an operation on registers according to the "Cntlz" instruction. In this figure, a register A as the original register stores 16 bytes value. A first 4 byte counted from the left in the original register represents a value "0x08215382" (i.e. "00001000001000010101001110000010B"), wherein four "0B" bits continues from the left end of the 4 byte and "1B" exists at fifth bit. Therefore, "4" is assigned as a value for a first 4 bytes to a register B as a subject register. A fourth 4 byte counted from the left in the original register represents a value "0x0xC0010000" (i.e. "11000000000000000001000000000000B"), wherein no "0B" bit are there on left side of the first "1B" bit counted from the left end of the fourth 4 byte. Therefore, "0" is assigned as a value for a fourth 4 bytes to the register B. Finally, respective 4 bytes in the register B which has 16 bytes length represents "4", "11", "7" and "0" from the left end.

(1-4-1-11) "And" Instruction

The "And" instruction means to assign a result of the "AND" operation between two original registers to a subject register. Each element of the subject register (hereinafter the element referred to as "subject element") is assigned a result of the "AND" operation of values in each element in the same position as the subject element in the two original registers (hereinafter the elements referred to as "original element", respectively). The value of the elements may be in unit of bytes.

Figure 22:
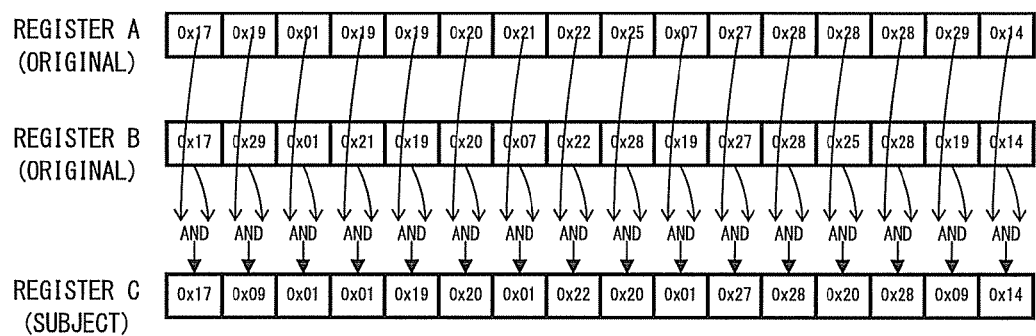
FIG. 22 is a conceptual diagram illustrating an operation on registers according to a "And" instruction.

FIG. 22 illustrates an exemplary conceptual diagram indicating an operation on registers according to the "And" instruction. In this figure, a first element counted from a left side in a register A as one of the original elements stores a value "0x17". A first element counted from a left side in a register B as the other of the original elements stores a value "0x17" as same as the first element in the register A. Therefore, a value "0x17" which is a result of the "AND" operation of the values of the original elements is assigned to a subject element that is a first element counted from a left side in a register C as the subject register. As same manner, a tenth element counted from a left side in a register A as one of the original elements stores a value "0x07". A tenth element counted from a left side in a register B as the other of the original elements stores a value "0x19". Therefore, a value "0x01" which is a result of the "AND" operation of the values of the original elements is assigned to a subject element that is a tenth element counted from a left side in a register C as the subject register.

(1-4-1-12) "Not" Instruction

The "Not" instruction means to assign a result of the "NOT" operation on an original register to a subject register. Each element of the subject register (hereinafter the element referred to as "subject element") is assigned a result of the "NOT" operation of values in each element in the same position as the subject element in the original register (hereinafter the element referred to as "original element"). The value of the elements may be in unit of bytes.

Figure 23:
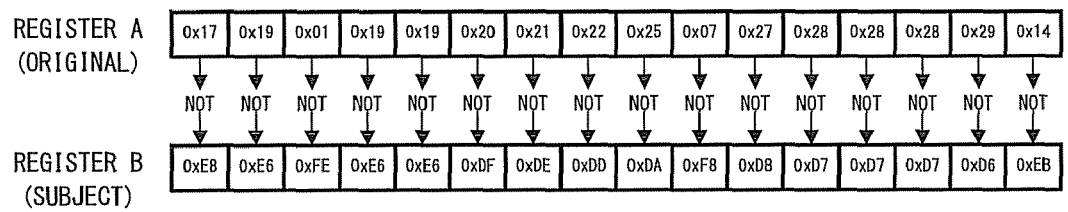
FIG. 23 is a conceptual diagram illustrating an operation on registers according to a "Not" instruction.

FIG. 23 illustrates an exemplary conceptual diagram indicating an operation on registers according to the "Not" instruction. In this figure, a first element counted from a left side in a register A as the original element stores a value "0x17". Therefore, a value "0xE8" which is a result of the "NOT" operation of the values of the original element is assigned to a subject element that is a first element counted from a left side in a register B as the subject register.

(1-4-1-13) "Nand" Instruction

The "Nand" instruction means to assign a result of the "NAND" operation between two original registers to a subject register. Each element of the subject register (hereinafter the element referred to as "subject element") is assigned a result of the "NAND" operation of values in each element in the same position as the subject element in the two original registers (hereinafter the elements referred to as "original element", respectively). The value of the elements may be in unit of bytes.

Figure 24:
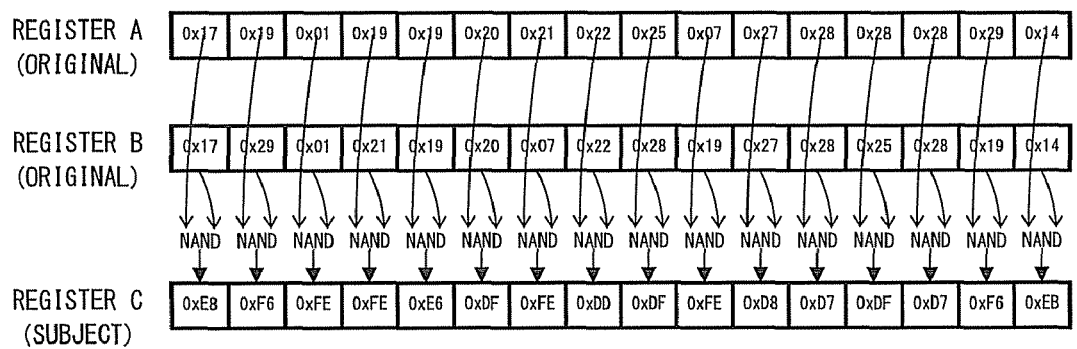
FIG. 24 is a conceptual diagram illustrating an operation on registers according to a "Nand" instruction.

FIG. 24 illustrates an exemplary conceptual diagram indicating an operation on registers according to the "Nand" instruction. In this figure, a first element counted from a left side in a register A as one of the original elements stores a value "0x17". A first element counted from a left side in a register B as the other of the original elements stores a value "0x17". Therefore, a value "0xE8" which is a result of the "NAND" operation of the values of the original elements is assigned to a subject element that is a first element counted from a left side in a register C as the subject register. In the same manner, a tenth element counted from a left side in a register A as one of the original elements stores a value "0x07". A tenth element counted from a left side in a register B as the other of the original elements stores a value "0x19". Therefore, a value "0xFE" which is a result of the "NAND" operation of the values of the original elements is assigned to a subject element that is a tenth element counted from a left side in a register C as the subject register.

A second exemplary implementation of the Huffman coding is described below with the SIMD instructions. The second exemplary implementation of the Huffman coding is compatibly utilizable for Acts 704, 714 and 724 is described in particular with reference to FIGS. 25 through 36.

(1-4-2) Operation of Second Exemplary Huffman Coding

Figure 25:
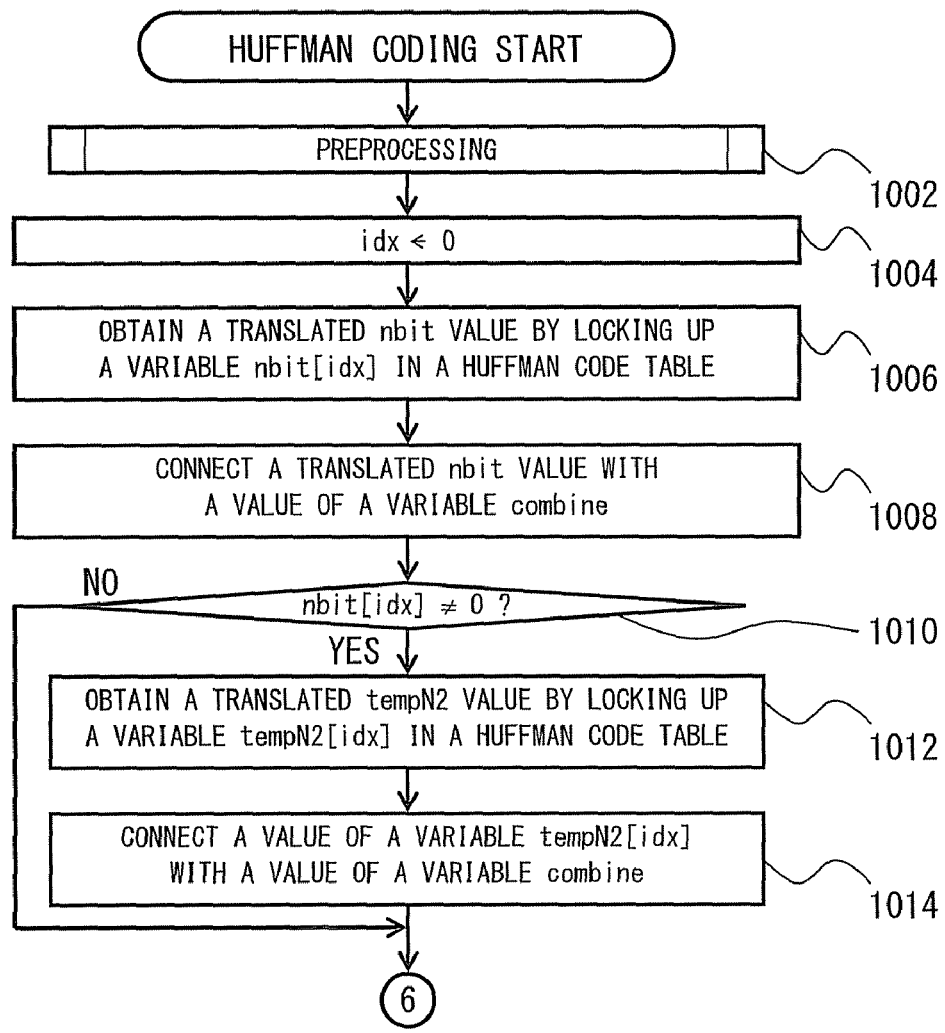
FIG. 25 is a flowchart illustrating a first part of a second exemplary Huffman coding.

FIG. 25 illustrates a first partial flowchart of the second exemplary Huffman coding.

At 1002, a preprocessing is executed. A matrix nbit[ ], a matrix tempN2[ ] are obtained in the preprocessing. Moreover, a register zeloren is set up to indicate which component of the MCU[N] is zero or more in the preprocessing. At 1004, zero is assigned to a variable idx. At 1006, a translated nbit value is obtained by looking up a value of a variable nbit[idx] in a huffman code table. At 1008, the translated nbit value is connected with a left side of a value of a variable combine.

At 1010, the variable nbit[idx] is compared with zero. If the variable nbit[idx] is not equal to zero (reference "YES" of Act 1010), a translated tempN2 value is obtained by looking up the value of the variable tempN2[idx] in a huffman code table at 1012, and the translated tempN2 value is connected with a left side of a value of the variable combine at 1014. Otherwise (reference "NO" of Act 1010), the act 1012 and the act 1014 are not executed. A circular terminal given a numeral "6" on bottom of the flowchart in FIG. 25 continues to a terminal given the same number on top of a flowchart in FIG. 26.

Figure 26:
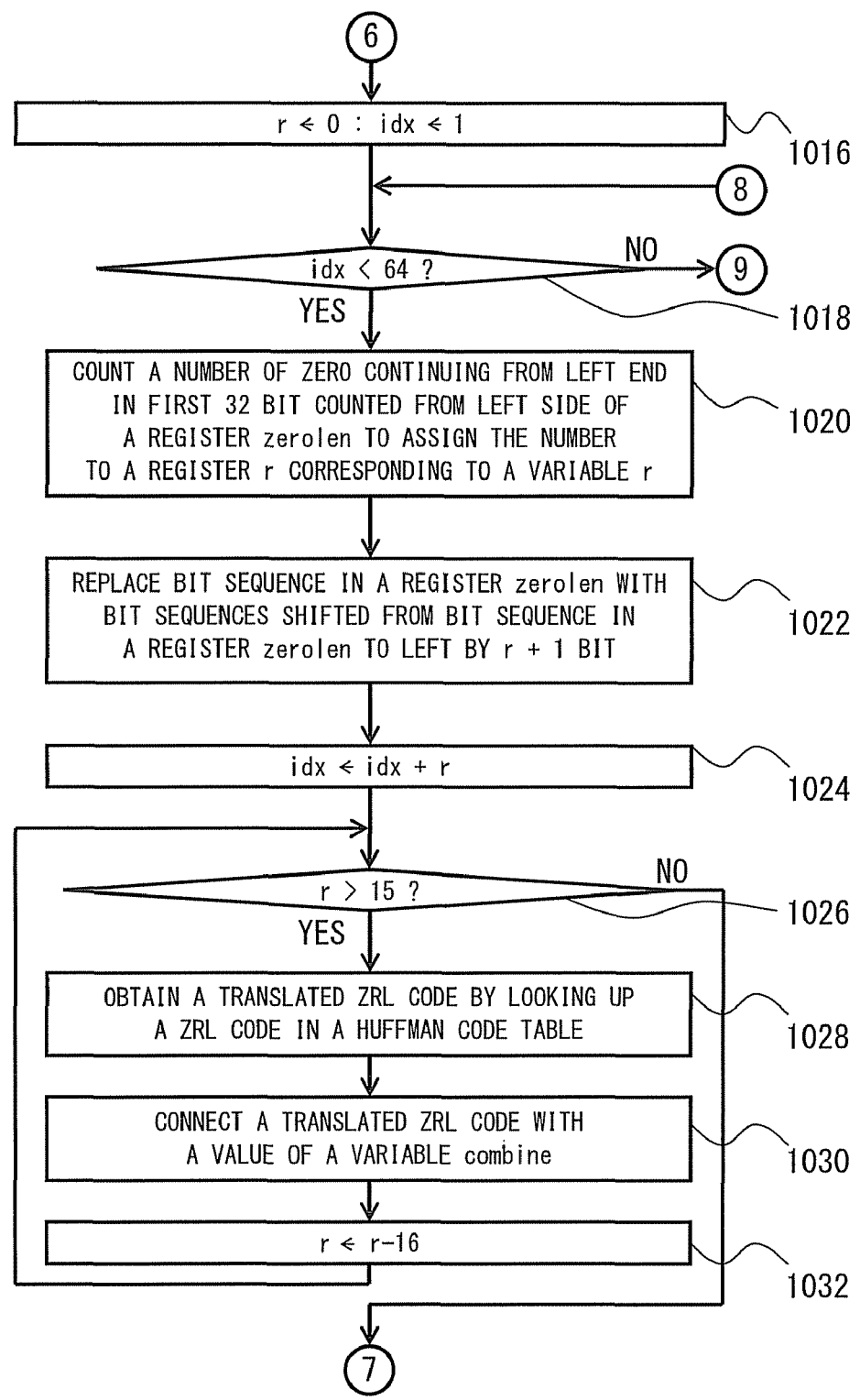
FIG. 26 is a flowchart illustrating a second part of a second exemplary Huffman coding.

FIG. 26 illustrates a second partial flowchart of the second exemplary Huffman coding. After the act 1010 or the act 1014, zero is assigned to the variable r and one is assigned to a variable idx at 1016.

At 1016, the variable idx is compared with sixty four. If the variable idx is smaller than sixty four (reference "YES" of Act 1018), a number of zero continuing from left end of a register zerolen is counted at 1020. The "Cntlz" instruction may be employed in the Act 1020 to count the number of zero continuing from left end of the register zerolen. The number is assigned to a register r corresponding to the variable r (i.e. the number is assigned to the variable r.).

At 1022, a bit sequence in the register zerolen is replaced with a bit sequence shifted from bit sequence in the register zerolen to left by (r+1) bits.

At 1024, a variable idx is increased by a variable r. At 1026, the variable r is compared with fifteen. If the variable r is greater than fifteen (reference "YES" of Act 1026), a translated ZRL code is obtained by looking up the ZRL code in the huffman code table at 1028. At 1030, the translated ZRL code is connected with the value of the variable combine. At 1032, sixteen is subtracted from the value of the variable r, and the act 846 is executed again.

Figure 27:
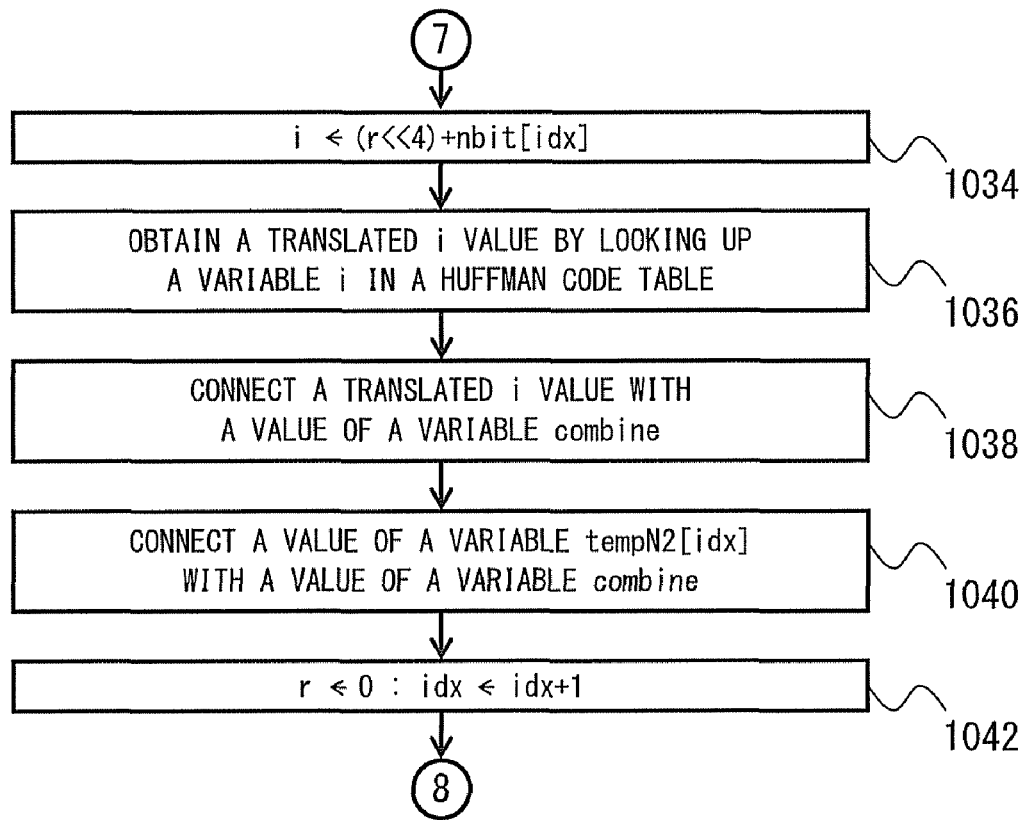
FIG. 27 is a flowchart illustrating a third part of a second exemplary Huffman coding.

If the variable r is not greater than fifteen at the act 1026 (reference "NO" of Act 1026), the loop including the act 1028 through the act 1032 is finished and then the Huffman coding continues to a circular terminal given a numeral "7" on bottom of the flowchart in FIG. 26 which continues to a terminal given the same number on top of a flowchart in FIG. 27.

FIG. 27 illustrates a third partial flowchart of the second exemplary Huffman coding. After the act 1032, a result of a calculation where the value of the variable r is shifted by four bits to the left and added the value of the variable nbit[idx] is assigned to a variable i at 1034. That is, the value of the variable nbit[idx] is added after the value of the variable r is multiplied by sixteen in decimal number.

At 1036, a translated i value is obtained by looking up the variable i in the huffman code table. At 1038, the translated i value is connected with a left side of the value of the variable combine.

At 1040, the value of the variable tempN2[idx] is connected with a left side, which is the left side of the translated i value connected in the act 1038, of the value of the variable combine. At 1042, zero is assigned to the variable r and the variable idx is incremented.

A circular terminal given a numeral "8" on bottom of the flowchart in FIG. 27 continues to a terminal given the same number connecting at between the act 1016 and 1018 of the flowchart in FIG. 26.

Figure 28:
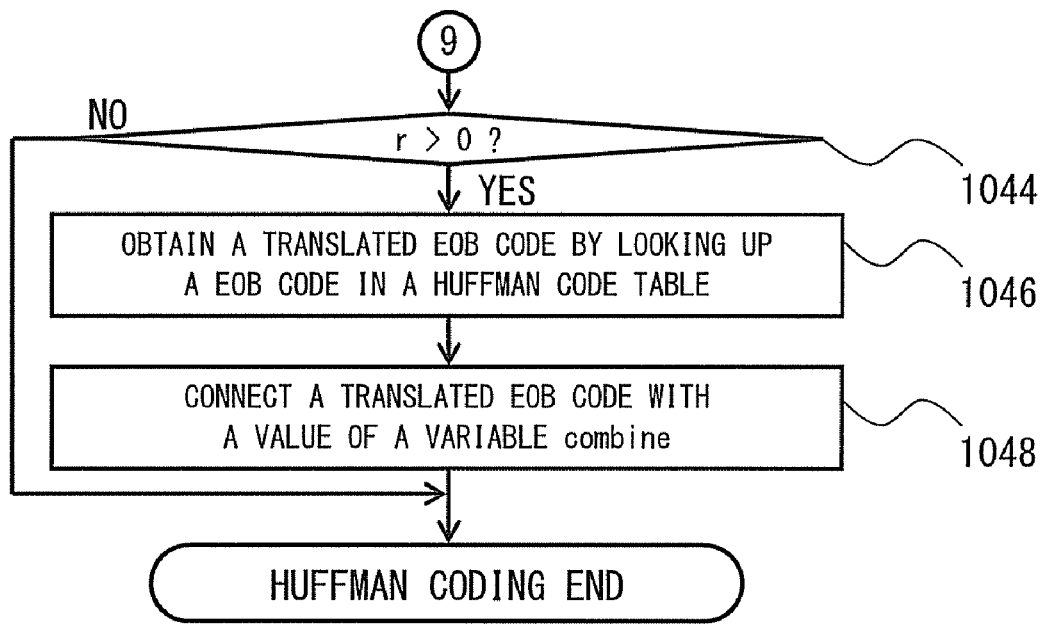
FIG. 28 is a flowchart illustrating a fourth part of a second exemplary Huffman coding.

If the variable idx is not smaller than sixty four at the act 1018 (reference "NO" of Act 1018), the loop including the act 1020 through the act 1042 is finished and the Huffman coding continues to a circular terminal given a numeral "9" on right of the act 1018 in the flowchart in FIG. 26 which continues to a terminal given the same number on top of a flowchart in FIG. 28.

FIG. 28 illustrates a fourth partial flowchart of the second exemplary Huffman coding. After the variable idx is determined as less than sixty four in the act 1018, the value of the variable r is compared with zero at 1044. If the value of the variable r is greater than zero (reference "YES" of Act 1044), a translated EOB code is obtained by looking up the EOB code in the Huffman code table at 1046.

At 1048, the translated EOB code is connected with a left side of the value of the variable combine and the Huffman coding ends. If the value of the variable r is not greater than zero (reference "NO" of Act 1044), the Huffman coding finishes without executing the act 1046 and the act 1048.

Figure 29:
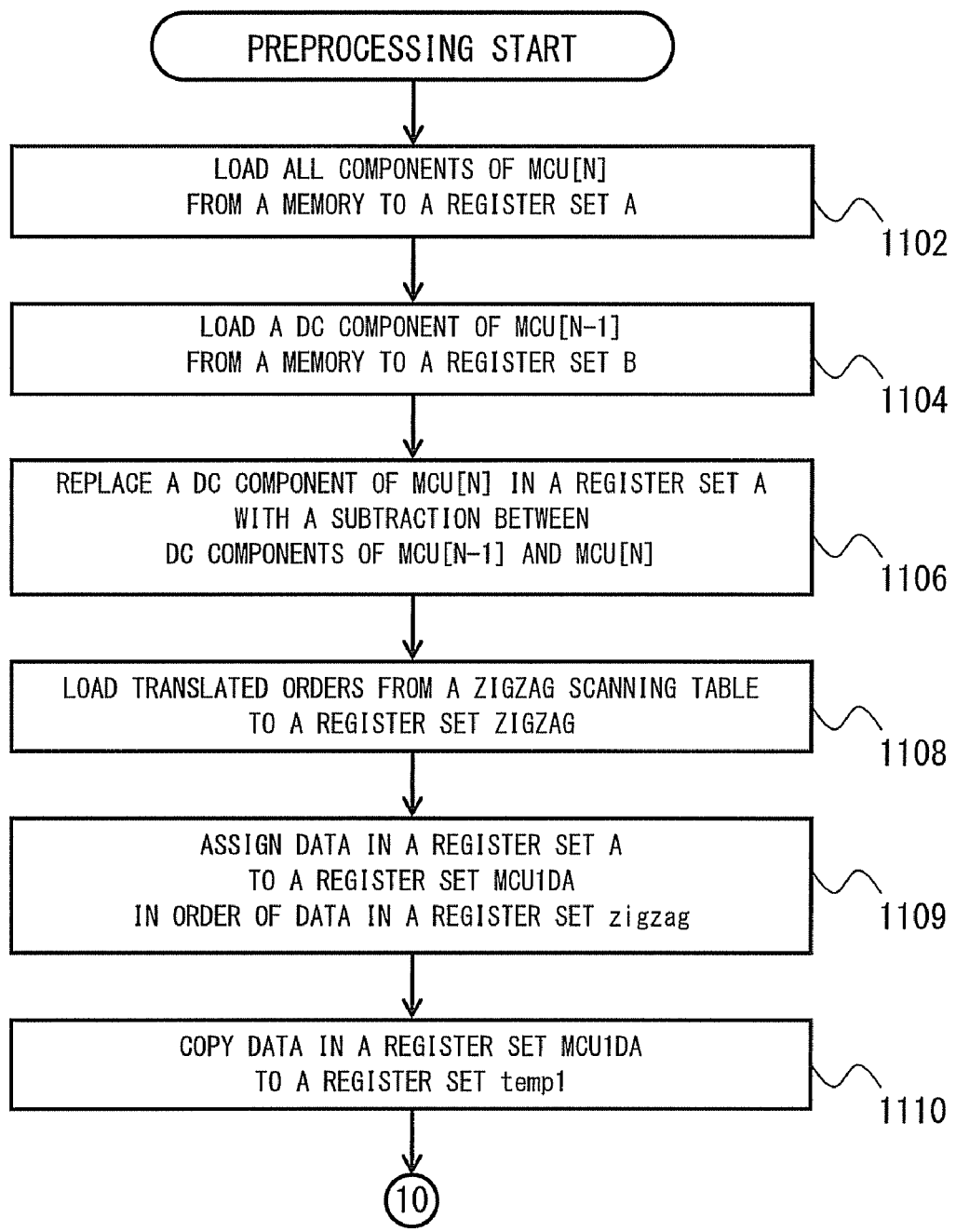
FIG. 29 is a flowchart illustrating a first part of a second exemplary preprocessing.

An example of the preprocessing is described below. FIG. 29 illustrates a first partial flowchart of the second exemplary preprocessing. At 1102, all components of MCU[N] are loaded from a memory to a register set A. The register set A means one or more registers associated with a matrix A. Hereinafter, a register set means one or more registers associated with a variable or a matrix. The matrix A may have 64 components because MCU[N] has 64 components. The register set A may include four registers if the matrix A has 64 components, the components are 16 bits value and a length of each register is 128 bits. Same number of the "Load" instruction as a number of registers included in the register set A may be employed to load all components of MCU[N] from a memory to a register set A.

At 1104, a DC component of MCU[N-1] is loaded from a memory to a register set B. The DC component of MCU[N-1] can be held in a register after the Huffman coding for the MCU[N-1], that is the Huffman coding processed previously, to use in this time. Moreover, AC components of MCU[N-1] can be discarded from the register set B after the Huffman coding for the MCU[N-1]. The "Load" instruction may be employed to load DC component of MCU[N-1] from a memory to a register set B.

At 1106, a DC component of MCU[N] in a register set A is replaced with a subtraction between the DC components of MCU[N-1] and MCU[N]. The subtraction between the DC components of MCU[N−1] and MCU[N] for each situation of N=0 to 63 can be prepared before the preprocessing, the Huffman coding or the VLC. The "Sub" instruction can be employed to obtain the subtraction between the DC components of MCU[N−1] and MCU[N] for just one of N or for all of N.

At 1108, translated orders are loaded to a register set zigzag from a zigzag scanning table in the memory. The translated orders can be loaded to the register set zigzag before any of the preprocessing, the Huffman coding or the VLC. The same number of the "Load" instructions as a number of registers included in the register set zigzag may be employed to load components of the zigzag scanning table from a memory to a register set zigzag.

At 1109, data in a register set A is assigned to a register set MCU1DA in order of data in a register set zigzag. The "Shuffle" instruction may be employed to assign data in a register set A to a register set MCU1DA in order of data in a register set zigzag, where each register of the register set A may be the original register, each register of the register set MCU1DA may be the subject register, and each register of the register set zigzag may be the reference register.

Generally speaking, latency for such instruction can be shorter than latencies for instructions for communicating with a memory. However, latency for such instruction can be equal to or longer than latencies for instructions for communicating with a memory. Moreover, the zigzag scanning executed with the "Shuffle" instruction may be implemented with less number of instructions than a conventional zigzag scanning including reading the memory for 64 times to obtain each of components of the MCU[ ]. Therefore, the zigzag scanning executed with the "Shuffle" instruction can be faster than the conventional zigzag scanning including reading the memory even the "Shuffle" instruction is executed a plurality of times to assign all data in a register set A to the register set MCU1DA. At 1110, data in a register set MCU1DA is copied to a register set temp1. The act 1108 through the act 1110 may collectively referred to as a zigzag scanning.

Figure 30:
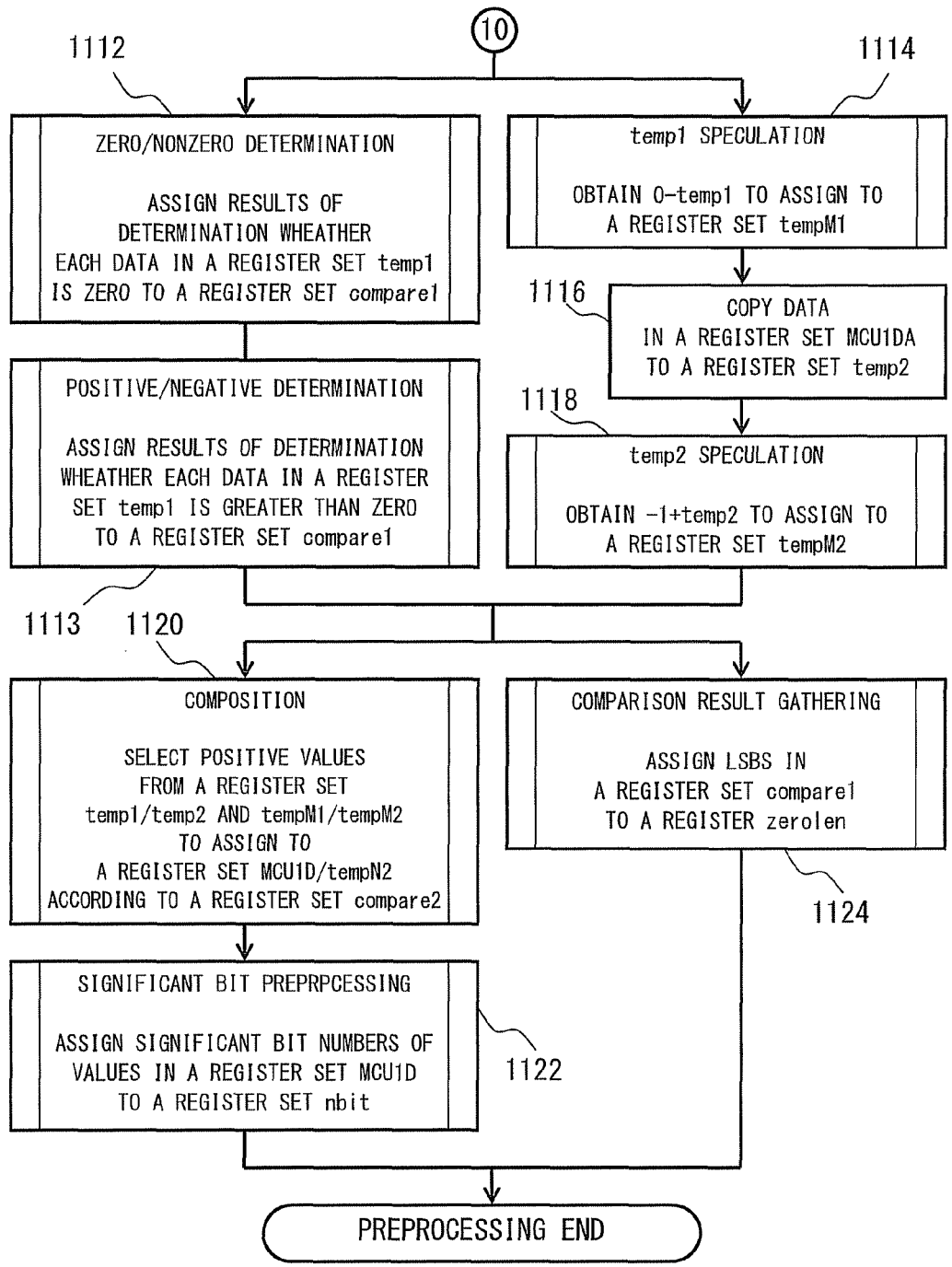
FIG. 30 is a flowchart illustrating a second part of a second exemplary preprocessing.

A circular terminal given a numeral "10" on the bottom of the flowchart in FIG. 29 continues to a terminal given the same number on top of a flowchart in FIG. 30. FIG. 30 illustrates a second partial flowchart of the second exemplary preprocessing. After the act 1110, a zero/non-zero determination is executed at 1112. In the zero/non-zero determination, a register set compare1 obtains a bit sequence representing results of determinations as to whether each data in a register set temp1 is zero or not.

At 1113, a positive/negative determination is executed. In the positive/negative determination, a register set compare2 obtains a bit sequence representing results of determinations as to whether each data in a register set temp1 is greater than zero or not. The act 1112 and the act 1113 can be alternatively executed in reverse order.

After the act 1110, a temp1 speculation is executed, too at 1114. In the temp1 speculation, results of calculations 0−temp1 are assigned to a register set tempM1. The results are additive inverses of values in the register set temp1. The register set tempM1 may include four registers if the matrix tempM1 has 64 components, the components are 16bits value and a length of each register is 128 bits (although any suitable number of registers, values, and lengths may be employed).

At 1116, the data in a register set MCU1DA is copied to a register set temp2. The data in a register set MCU1DA can be copied to the register set temp2 at same time of the act 1110, instead of the act 1116.

At 1118, a temp2 speculation is executed. In the temp2 speculation, results of calculations −1+temp2 are assigned to a register set tempM2. The register set tempM2 may include four registers if the matrix tempM2 has 64 components, the components are 16bits value and a length of each register is 128 bits.

A branch on the act 1113 through 1114 and a branch on the acts 1114 through 1118 can be implemented in serial algorithms or in parallel algorithms if there is enough resource to execute both branches in parallel because both branches do not have any mutual dependency.

After the acts 1113 and 1118, a composition is executed at 1120. In the composition, positive values are collected from the register set temp1 or the register set tempM1. The positive values are assigned to a register set MCU1D according to the values in the register set compare2. Furthermore, subsidiary values are selected from the register set temp2 or the register set tempM2. The subsidiary values are assigned to a register set tempN2 according to the values in the register set compare2.

At 1122, a significant bit preprocessing is executed. In the significant bit preprocessing, significant bit numbers of values in the register set MCU1D are assigned to a register set nbit.

After the acts 1113 and 1118, a comparison result gathering is executed at 1120. In the comparison result gathering, LSBs in the register set compare1 are gathered to the register zerolen. A branch on the act 1124 and a branch on the acts 1120 through 1122 can be implemented in serial algorithms or in parallel algorithms if there is enough resource to execute both branches in parallel because both branches do not have any mutual dependency. The preprocessing is finished after the acts 1122 and 1124.

Figure 31:
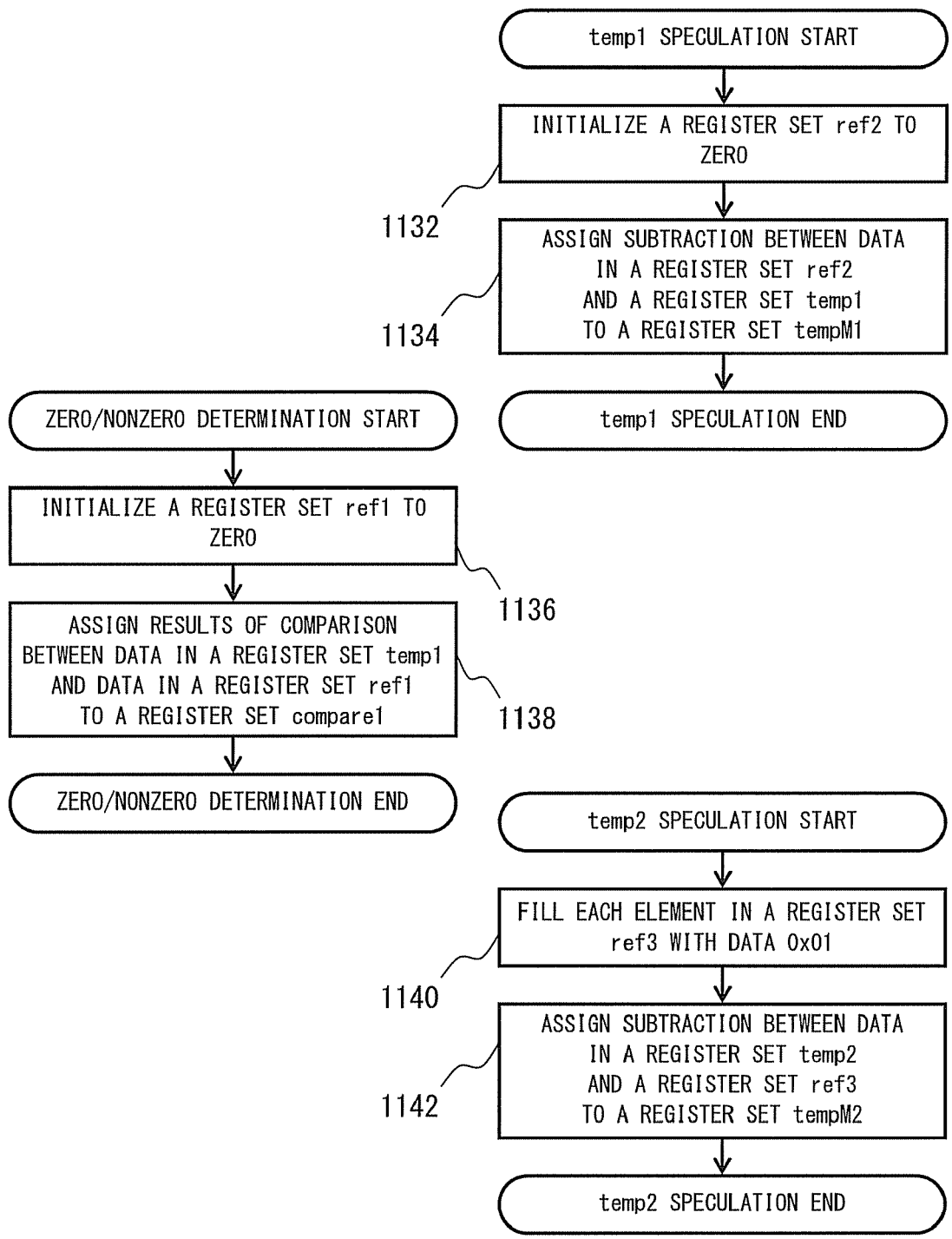
FIG. 31 is a flowchart illustrating an exemplary zero/non-zero determination, an exemplary temp1 speculation and an exemplary temp2 speculation.

FIG. 31 illustrates exemplary flowcharts of the zero/non-zero determination, the temp1 speculation, and the temp2 speculation. In the zero/non-zero determination, a register set ref1 is initialized to zero at 1136. At 1138, results of comparisons between data in a register set temp1 and data in a register set ref1 are assigned to the register set compare1.

The "Cmpgt" instruction may be employed to assign the results of comparisons between data in a register set temp1 and data in a register set ref1, where each register of the register set temp1 may be type-casted from singed type to unsigned type to be used as the original register, each register of the register set ref1 may be the reference register and each register of the register set compare1 may be the subject register.

Instead of the manner explained above, a combination of the "Cmpeq" instruction and the "Not" instruction or a combination of the "And" instruction and the "Not" instruction can be alternatively employed. The "Cmpeq" instruction or the "And" instruction is for comparing with the data in each of the register set temp1 and data in each of the register set ref1, where each of the register set temp1 may be the original register and each of the register set ref1 may be the reference register. The "Not" instruction is used for assigning negative data of the result of the "Cmpeq" instruction to the register set compare1.

Furthermore, the "Nand" instruction can be employed for execution of the act 1138, where each of the register set temp1 may be the original register, each of the register set ref1 may be the reference register, and the register set compare1 may be the subject register. The zero/non-zero determination is finished after the act 1136.

In the temp1 speculation, a register set ref2 is initialized to zero at 1132. At 1134, a register set tempM1 is assigned subtractions between data in the register set ref2 and data in the register set temp1. The "Sub" instruction may be employed to assign the subtractions between data in the register set ref2 and data in the register set temp1 to the register set tempM1, where each register of the register set ref2 may be the minuend register, each register of the register set temp1 may be the subtrahend register and each register of the register set tempM1 may be the subject register. The temp1 speculation is finished after the act 1134.

In the temp2 speculation, each element in a register set ref3 is filled with one at 1140. At 1142, a register set tempM2 is assigned subtractions between data in the register set temp2 and data in the register set ref3. The "Sub" instruction may be employed to assign the subtractions between data in the register set temp2 and data in the register set ref3 to the register set tempM2, where each register of the register set temp2 may be the minuend register, each register of the register set ref3 may be the subtrahend register and each register of the register set tempM2 may be the subject register. The temp2 speculation is finished after the act 1142.

Figure 32:
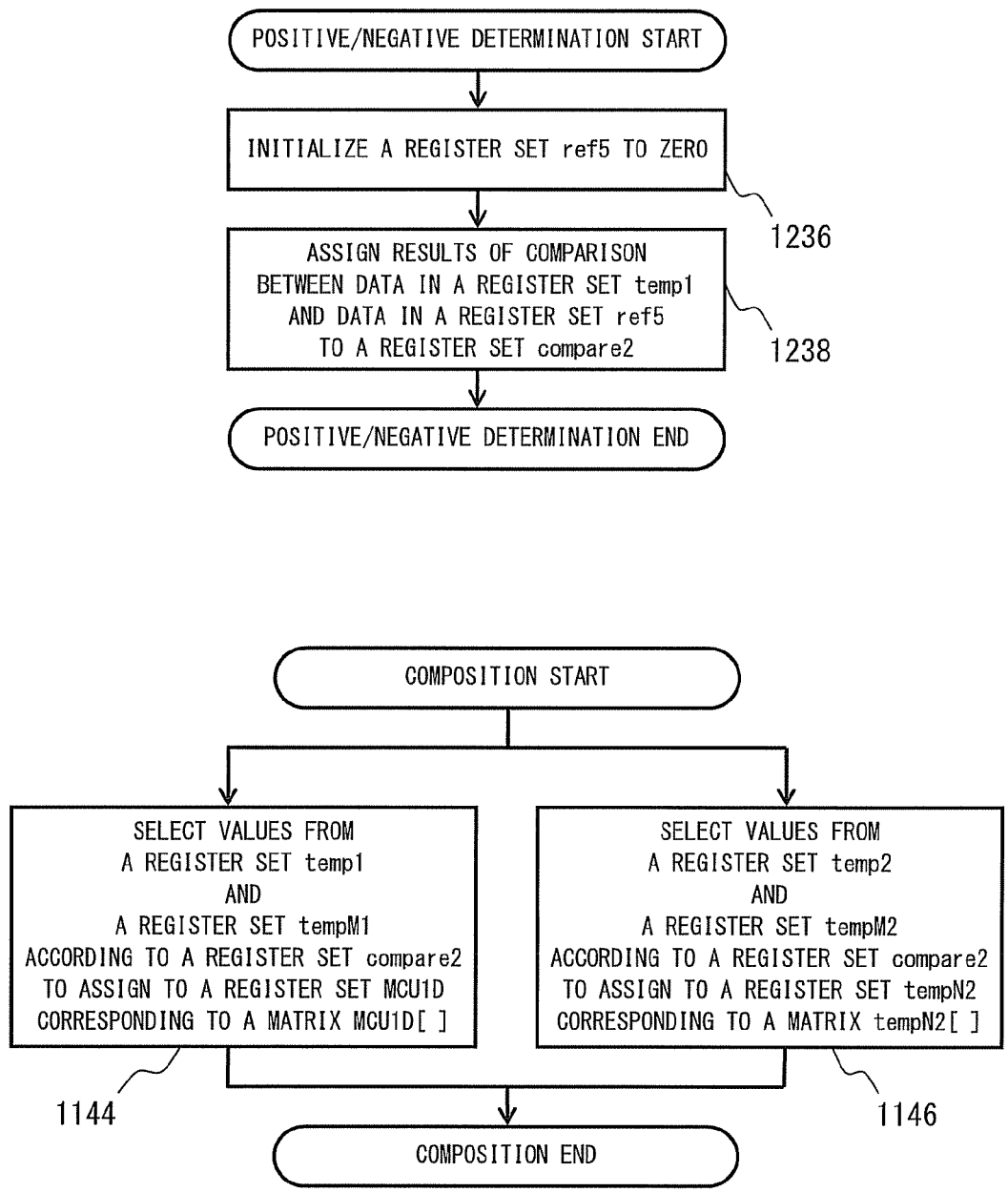
FIG. 32 is a flowchart illustrating an exemplary composition.

FIG. 32 illustrates an exemplary flowchart of the positive/negative determination and the composition. In the positive/negative determination, a register set ref5 is initialized to zero at 1236. The register set ref1 can be used instead of the register set ref5 without the act 1236 if the register set ref1 is already initialized to zero in the act 1136. At 1238, results of comparisons between data in a register set temp1 and data in a register set ref5 are assigned to the register set compare2.

The "Cmpgt" instruction may be employed to assign the results of comparisons between data in a register set temp1 and data in a register set ref2, where each register of the register set temp1 may be used as the original register without type-casting, each register of the register set ref5 may be the reference register and each register of the register set compare2 may be the subject register.

In the composition, the register set MCU1D is assigned values selected from the register set temp1 and the register set tempM1 according to the register set compare2 at 1144. The "Select" instruction may be employed to assign the values selected from the register set temp1 and the register set tempM1 according to the register set compare2 to the register set tempN1, where each register of the register set temp1 may be the primary original register, each register of the register set tempM1 may be the secondary original register, each register of the register set compare2 may be the reference register and each register of the register set MCU1D may be the subject register. Additionally, the register set tempN2 is assigned values selected from the register set temp2 and the register set tempM2 according to the register set compare2 at 1146. The "Select" instruction may be employed to assign the values selected from the register set temp2 and the register set tempM2 according to the register set compare2 to the register set tempN2, where each register of the register set temp2 may be the primary original register, each register of the register set tempM2 may be the secondary original register, each register of the register set compare2 may be the reference register and each register of the register set tempN2 may be the subject register. The act 1144 and the acts 1146 can be implemented in serial algorithms or in parallel algorithms if there is enough resource to execute both actions simultaneously because both actions do not have any mutual dependency. The composition is finished after the act 1144 and the act 1146.

Figure 33:
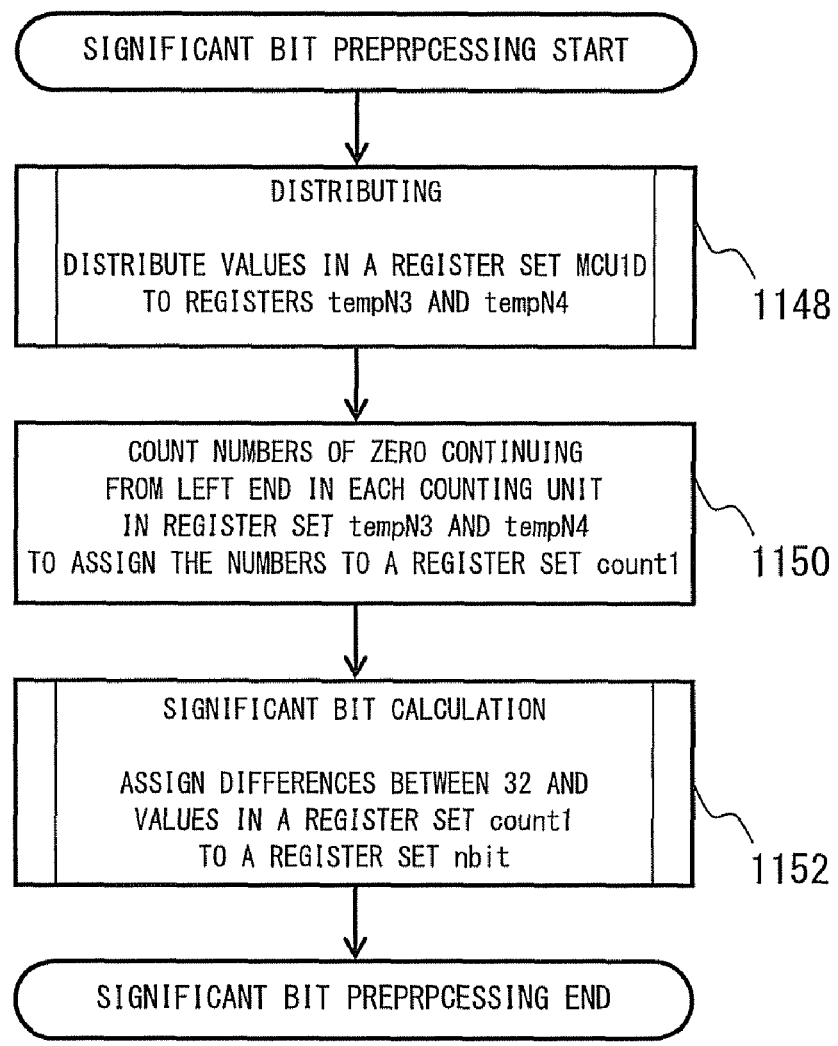
FIG. 33 is a flowchart illustrating an exemplary significant bit preprocessing.

FIG. 33 illustrates an exemplary flowchart of the significant bit preprocessing. At 1148, a distribution is executed. In the distribution, values in a register set MCU1D are distributed to registers tempN1 and tempN2.

At 1150, a register set count1 is assigned numbers of zero continuing from the left end in each counting unit in register set tempN1 AND tempN2. The "Cntlz" instruction may be employed to assign the numbers of zero continuing from the left end in each counting unit in register set tempN1 and tempN2 to the register set count1, where each of the registers tempN1 and tempN2 may be the original registers, and each register of the count1 may be the subject register. At 1152, significant bit calculation is executed. In the significant bit calculation, a register set nbit is assigned differences between thirty two and values in a register set count1. The significant bit preprocessing is finished after the act 1152.

Figure 34:
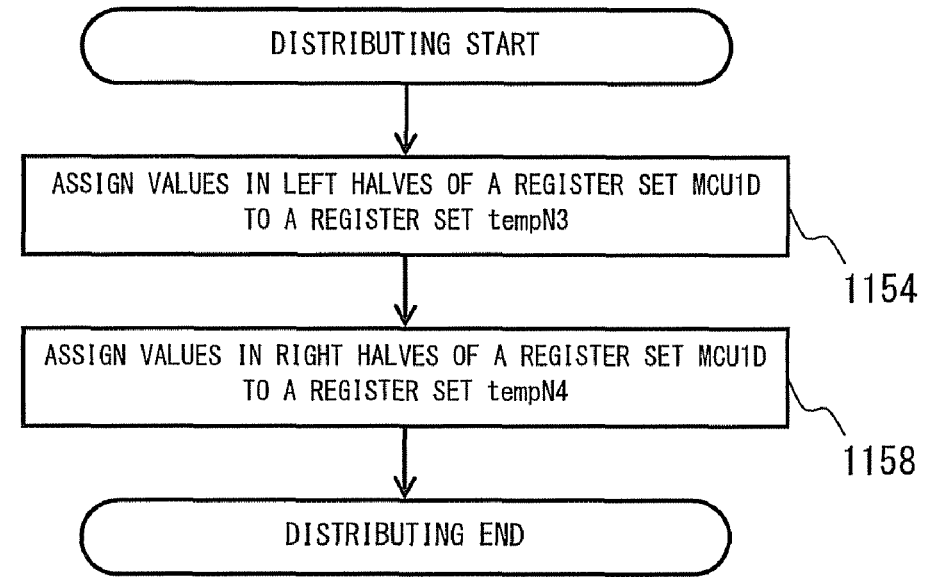
FIG. 34 is a flowchart illustrating an exemplary distributing and an exemplary significant bit calculation.
Figure 34:
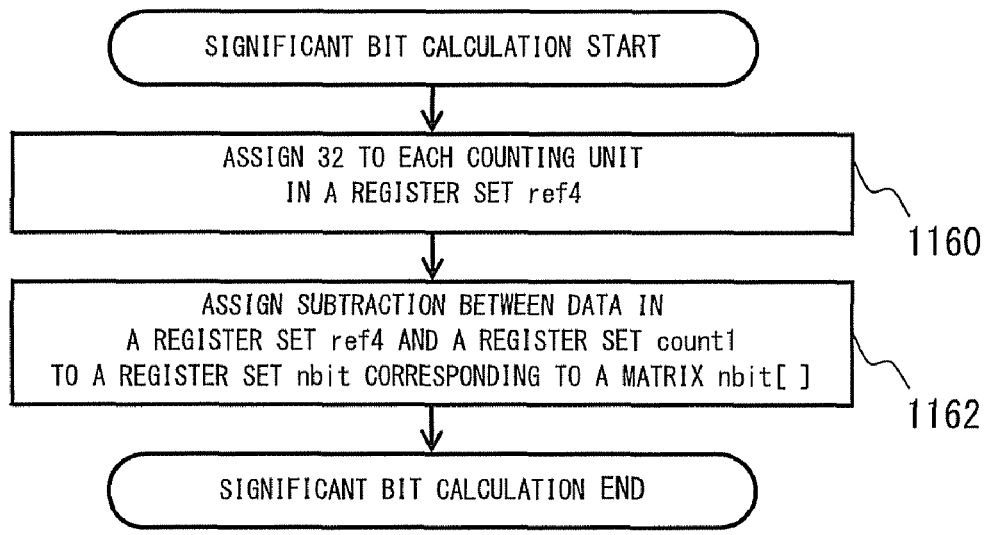

FIG. 34 illustrates exemplary flowcharts of the distributing and the significant bit calculation. In the distribution, a register set tempN3 is assigned values in left halves of a register set MCU1D at 1154. At 1158, a register set tempN4 is assigned values in right halves of a register set MCU1D. The distribution is finished after the act 1158.

In the significant bit calculation, each counting unit in a register set ref4 is assigned thirty two at 1160. At 1162, a register set nbit assigned subtractions between data in a register set ref4 and a register set count1. The significant bit calculation is finished after the act 1158. The "Sub" instruction may be employed to assign the subtractions between data in the register set ref4 and data in the register set count1 to the register set nbit, where each register of the register set ref4 may be the minuend register, each register of the register set count1 may be the subtrahend register and each register of the register set nbit may be the subject register.

Figure 35:
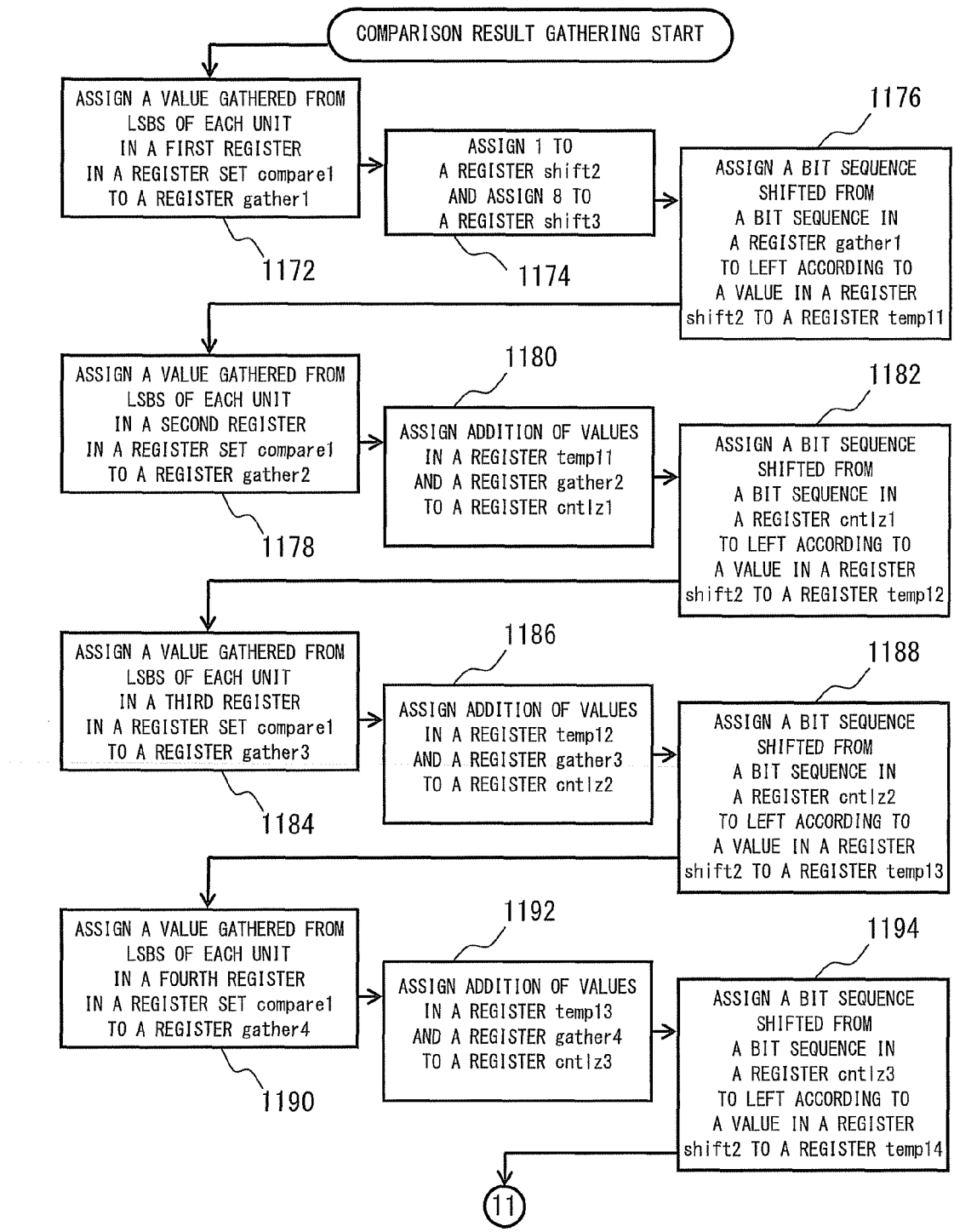
FIG. 35 is a flowchart illustrating a first part of a comparison result gathering.

FIG. 35 illustrates a first partial exemplary flowchart of the comparison result gathering. At 1172, a register gather1 is assigned a value gathered from LSBs of each unit in a first register in the register set compare1. The "Gather" instruction may be employed to assign the value gathered from LSBs of each unit in a first register in the register set compare1 to the register gather1, where the first register of the register set compare1 may be the original register and the register gather1 may be the subject register.

At 1174, a register shift2 is assigned one and a register shift 3 is assigned 9. The register shift2 and shift3 can be assigned one before any of the comparison result gathering, the preprocessing, the Huffman coding, or the VLC. The registers shift2 and shift3 may store one or nine as a significant bit for the "Shift" instruction, respectively.

At 1176, a register temp11 is assigned a bit sequence shifted from a bit sequence in the register gather1 to left according to values in the register shift2. The "Shift" instruction may be employed to assign the bit sequence shifted from the bit sequence in the register gather1 to left according to values in the register shift2, where the register gather1 may be the original register, the register shift2 may be the reference register and the temp11 may be the subject register.

At 1178, a register gather2 is assigned a value gathered from LSBs of each unit in a second register in the register set compare1. The "Gather" instruction may be employed for the act 1178 similarly to the act 1172. At 1180, a register cntlz1 is assigned additions of values in the register temp11 and the register gather2. The "Add" instruction may be employed to assign the additions of values in the register temp11 and the register gather2, wherein the original registers may be the registers temp 11 and gather2 and the subject register may be the register cntlz1. At 1182, a register temp12 is assigned a bit sequence shifted from a bit sequence in the register cntlz1 to left according to values in the register shift2. The "Shift" instruction may be employed for the act 1182 similarly to the act 1176.

At 1184, a register gather3 is assigned a value gathered from LSBs of each unit in a third register in the register set compare1. The "Gather" instruction may be employed for the act 1184 similarly to the act 1172. At 1186, a register cntlz2 is assigned additions of values in the register temp12 and the register gather3. The "Add" instruction may be employed for the act 1186 similarly to the act 1180. At 1188, a register temp13 is assigned a bit sequence shifted from a bit sequence in the register cntlz2 to left according to values in the register shift2. The "Shift" instruction may be employed for the act 1188 similarly to the act 1176.

At 1190, a register gather4 is assigned a value gathered from LSBs of each unit in a fourth register in the register set compare1. The "Gather" instruction may be employed for the act 1190 similarly to the act 1172. At 1192, a register cntlz3 is assigned additions of values in the register temp13 and the register gather4. The "Add" instruction may be employed for the act 1192 similarly to the act 1180. At 1194, a register temp14 is assigned a bit sequence shifted from a bit sequence in the register cntlz3 to left according to values in the register shift2. The "Shift" instruction may be employed for the act 1194 similarly to the act 1176.

Figure 36:
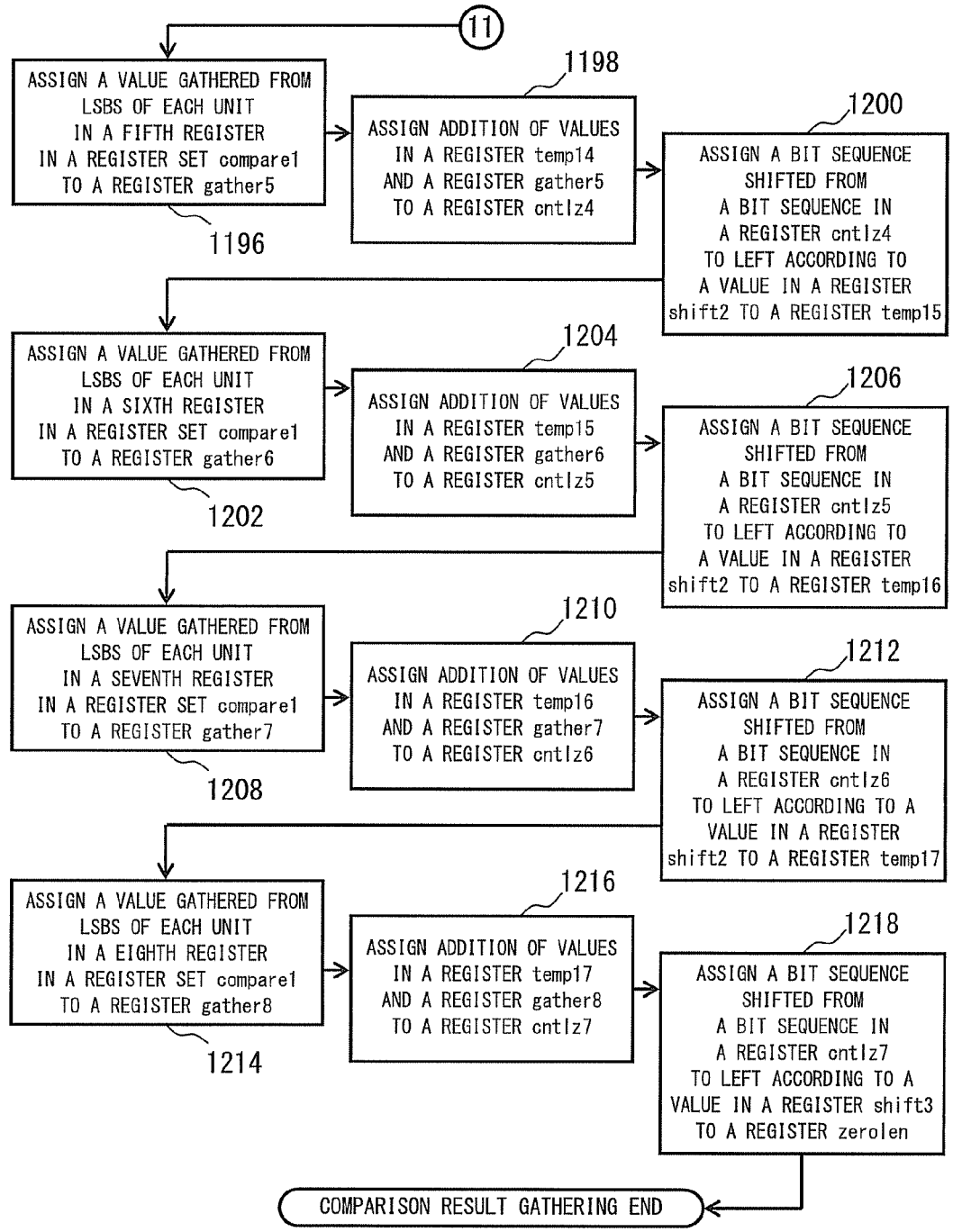
FIG. 36 is a flowchart illustrating a second part of a comparison result gathering.

A circular terminal given a numeral "11" on bottom of the flowchart in FIG. 35 continues to a terminal given the same number on top of a flowchart in FIG. 36. FIG. 36 illustrates a second partial exemplary flowchart of the comparison result gathering. After the act 1194, a register gather5 is assigned a value gathered from LSBs of each unit in a fifth register in the register set compare1 at 1196. The "Gather" instruction may be employed for the act 1196 similarly to the act 1172. At 1198, a register cntlz4 is assigned additions of values in the register temp14 and the register gather5. The "Add" instruction may be employed for the act 1198 similarly to the act 1180. At 1200, a register temp15 is assigned a bit sequence shifted from a bit sequence in the register cntlz4 to left according to values in the register shift2. The "Shift" instruction may be employed for the act 1200 similarly to the act 1176.

At 1202, a register gather6 is assigned a value gathered from LSBs of each unit in a sixth register in the register set compare1. The "Gather" instruction may be employed for the act 1202 similarly to the act 1172. At 1204, a register cntlz5 is assigned additions of values in the register temp15 and the register gather6. The "Add" instruction may be employed for the act 1204 similarly to the act 1180. At 1206, a register temp16 is assigned a bit sequence shifted from a bit sequence in the register cntlz5 to left according to values in the register shift2. The "Shift" instruction may be employed for the act 1206 similarly to the act 1176.

At 1208, a register gather7 is assigned a value gathered from LSBs of each unit in a seventh register in the register set compare1. The "Gather" instruction may be employed for the act 1208 similarly to the act 1172. Act 1210, a register cntlz6 is assigned additions of values in the register temp16 and the register gather7. The "Add" instruction may be employed for the act 1192 similarly to the act 1210. At 1212, a register temp17 is assigned a bit sequence shifted from a bit sequence in the register cntlz6 to left according to values in the register shift2. The "Shift" instruction may be employed for the act 1212 similarly to the act 1176.

At 1214, a register gather8 is assigned a value gathered from LSBs of each unit in an eighth register in the register set compare1. At 1216, a register cntlz7 is assigned additions of values in the register temp17 and the register gather8. The "Add" instruction may be employed for the act 1192 similarly to the act 1216. The LSBs in the register set compare1 are finally gathered into the most right side of the register cntlz7. At 1218, a register temp18 is assigned a bit sequence shifted from a bit sequence in the register cntlz7 to left according to values in the register shift3. The "Shift" instruction may be employed for the act 1218 similarly to the act 1176. As a result, the LSBs are stored at the most left side of the register zerolen. The comparison result gathering is finished after the act 1218.

(2) Exemplary Embodiment of an Image Processing Apparatus

Figure 37:
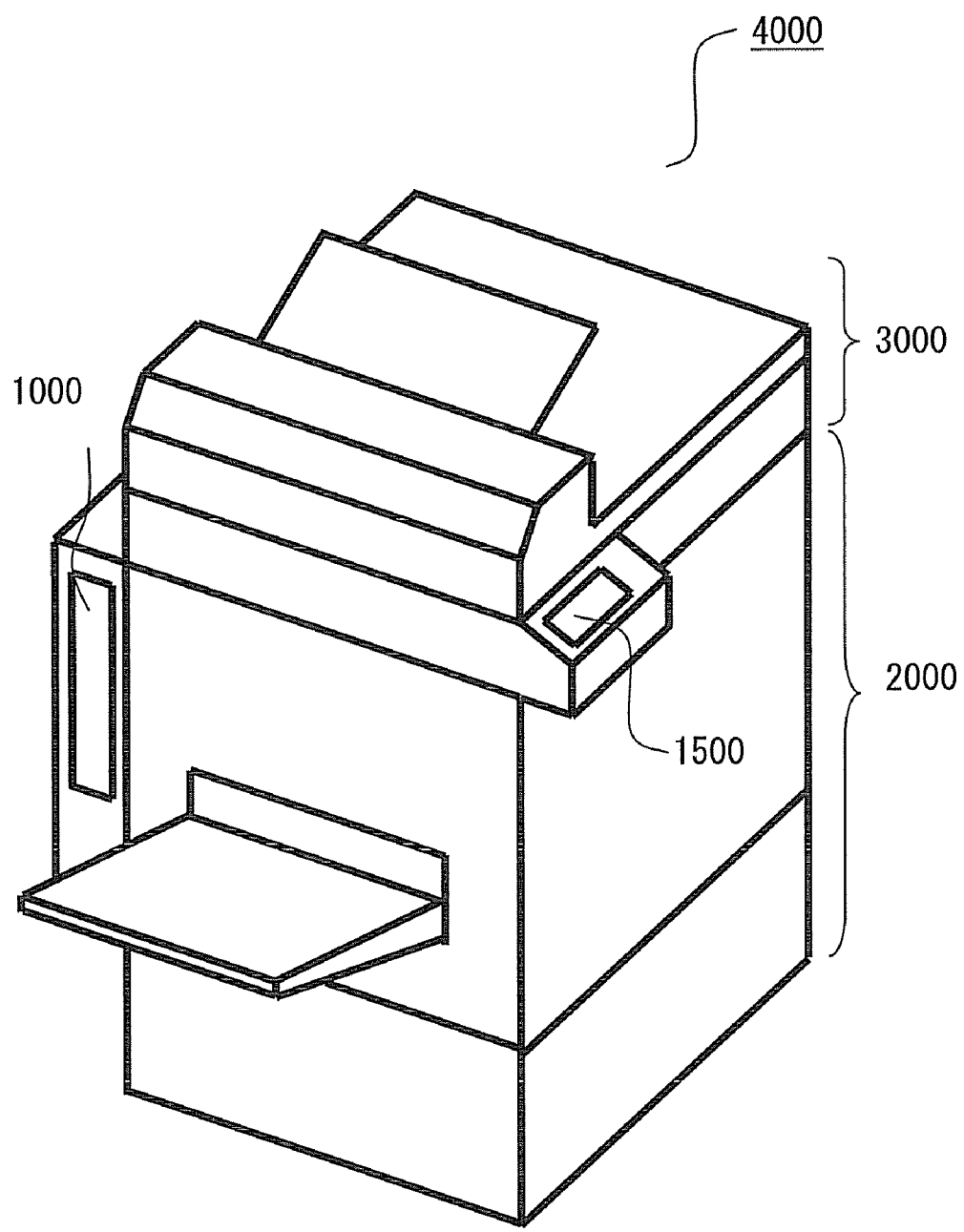
FIG. 37 is a perspective diagram illustrating an image processing apparatus.

FIG. 37 illustrates a perspective view of an image processing apparatus 4000 as an exemplary embodiment. The image processing apparatus 4000 includes a scanner 3000, a printer 2000, and a controller 1000.

The scanner 3000 above the printer 2000 scans an image of a manuscript to generate a scan image data to provide to the controller 1000. The controller 1000 is capable of converting scan image data into raster image data. The printer 2000 prints an image according to a raster image data provided by the controller 1000. The printer 2000 may have the operation panel 1500. Generally, a side where the operation panel 1500 is set at is termed a front side, and the opposite side is so called a rear side. The controller 1000 may be physically set at the rear side. The operation panel 1500 may have a button to start the scanning, and may have buttons to select a mode for an image processing from pluralities of choices.

The controller 1000 can convert the scan image data to the raster image data, and can convert the scan image data to a compressed image data. The controller 1000 may store the compressed image data in an internal storage, and may transmit the compressed image data to other computing devices via the internet by using protocols such as POP3, FTP, SMB, NFS, and others.

Figure 38:
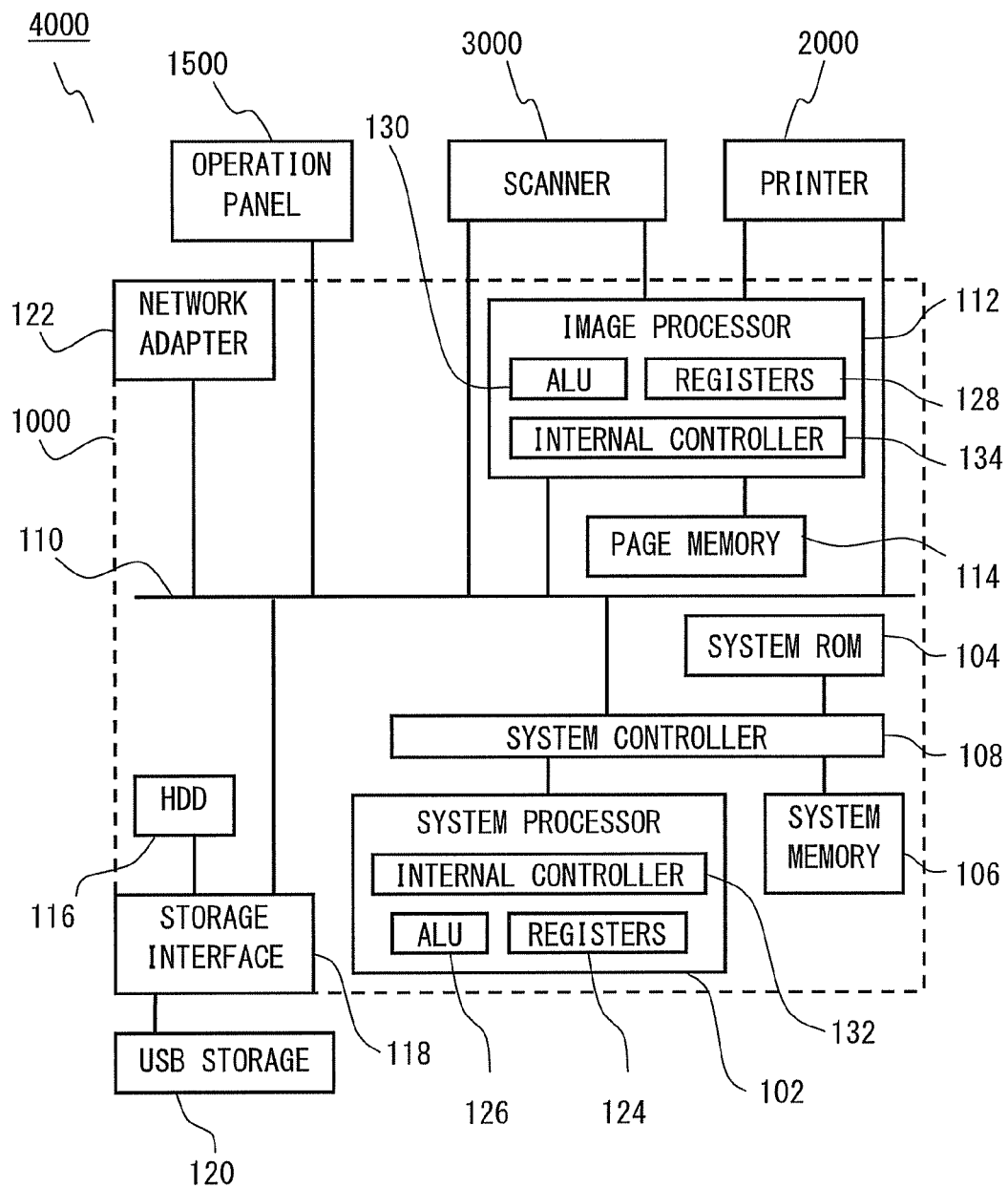
FIG. 38 is a block diagram illustrating a controller.

FIG. 38 illustrates an exemplary block diagram of the controller 1000. The controller 1000 includes a system processor 102, a system ROM (Read Only Memory) 104, a system memory 106, a system controller 108, a bus 110, an image processor 112, a page memory 114, a HDD (Hard Disk Drive) 116, a storage interface 118 and a network adapter 122.

The system processor 102 determines a direction input from the operation panel 1500, and produces instructions for other components according to the direction and a programmed instruction stored in the system ROM 104. The system processor 102 uses the system memory 106 as a working memory space. The system controller 108 coordinates communications for the system processor 102, the system ROM 104, the system memory 106, and other components connected through the bus 110.

The storage interface 118 has a feature to write a data into, as well as to read the data out from, a controller-internal storage component such as the HDD 116 and a controller-external storage component such as a USB (Universal Serial Bus) storage 120. The storage interface 118 selects a storage component to communicate with according to an instruction produced by the system processor 102. The storage interface 118 exchanges the data with the system processor 102 via the bus 110 and the system controller 108.

The HDD 116 and the system memory 106 may store programs for executing the actions. The system processor 102 and the image processor 112 may execute the actions according to the programs.

When the system processor 102 determines a direction for a copying operation input from the operation panel 1500, the system processor 102 produces instructions for the scanner 3000, the image processor 112, and the printer 2000. According to the instructions, the scanner 3000 scans the image of the manuscript to generate a scan image data. The image processor 112 receives the scan image data from the scanner 3000 and lays out the scan image data on the page memory 114. The image processor 112 converts the scan image data on the page memory 114 to the raster image data, and lays out the raster image data on the page memory 114. The image processor 112 provides the raster image data on the page memory 114 to the printer 2000. The printer 2000 prints the image according to the raster image data.

If the system processor 102 determines that the manuscript includes a plurality of pages, the image processor 112 may convert the scan image data on the page memory 114 to a compressed image data to store into the HDD 116, and the image processor 112 may convert the compressed image data red out from the HDD 116 to the raster image data to lay out on the page memory 114 after all of the plurality of pages are stored into the HDD 116.

When the system processor 102 determines a direction for scanning to store operation input from the operation panel 1500, the system processor 102 produces instructions for the scanner 3000 and the image processor 112. According to the instructions, the scanner 3000 scans the image of the manuscript to generate a scan image data. The image processor 112 receives the scan image data from the scanner 3000 and lays out the scan image data on the page memory 114. The image processor 112 converts the scan image data on the page memory 114 to a compressed image data and store the compressed image data on the page memory 114.

The system processor 102 produces an instruction for the storage interface 118 to store the compressed image data, which is transferred from the page memory 114 via the image processor 112, into the HDD 116 if the direction for scanning to store operation includes a storing destination as a HDD 116.

The system processor 102 produces an instruction for the storage interface 118 to store the compressed image data into a USB (Universal Serial Bus) storage 120 if the direction for scanning to store operation includes a storing destination as the USB storage 120.

When the system processor 102 determines a direction for scanning to send operation input from the operation panel 1500, the system processor 102 produces instructions for the scanner 3000 and the image processor 112. According to the instructions, the scanner 3000 scans the image of the manuscript to generate a scan image data. The image processor 112 receives the scan image data from the scanner 3000 and lays out the scan image data on the page memory 114. The image processor 112 converts the scan image data on the page memory 114 to a compressed image data and store the compressed image data on the page memory 114.

The system processor 102 produces an instruction for the storage interface 118 to store the compressed image data, which is transferred from the page memory 114 via the image processor 112, into the HDD 116. The system processor 102 prepares a transfer data set containing the compressed image data stored in the HDD 116 according to a network transfer protocol such as POP3, FTP, SMB, NFS and others. The system processor 102 produces an instruction for the network adapter 122 to transmit the transfer data set. Optionally, one or more additional processors for preparing the transfer data set may be provided on the controller 1000.

When the system processor 102 determines a direction for printing operation received through the network adapter 122, the system processor 102 produces instructions for the image processor 112 and the printer 2000. According to the instructions, the image processor 112 receives a raster image data processed by the system processor 102 and lays out the raster image data on the page memory 114. The image processor 112 provides the raster image data on the page memory 114 to the printer 2000. The printer 2000 prints the image according to the raster image data.

If the system processor 102 determines that the direction for printing operation is too large for the system memory 106 in data size, then the direction is stored into the HDD 116 once, and red out to the system memory 106 for processing of the system processor 102.

If the image processor 112 has a feature to produce the raster image data from the direction, then the image processor 112 may process the raster image data instead of the system processor 102. The image processor 112 may communicate with the storage interface 118 to obtain the direction from the HDD 116 without a help by the system processor 102.

The procedures exemplary explained in the above sections (1-1) through (1-4-2) can be used to execute conversions from the scan image data on the page memory 114 to a compressed image data in the copying operation for the manuscript including a plurality of pages, the scanning to store operation, and the scanning to send operation. If the image processing apparatus 4000 is capable of any other operations including conversions from an original image data to a compressed image data, then the procedures can be employed for conversions included in the operations.

For the VLC processes explained with reference to FIG. 6, the Y Huffman coding combination 730, the Cb Huffman coding combination 732, and the Cr Huffman coding combination 734 may be distributed as processes for the system processor 102 and processes for the image processor 112. For example, the Y Huffman coding combination 730 is processed as a process A by the system processor 102, the Cb Huffman coding combination 732 and the Cr Huffman coding combination 734 are processed by the image processor 112 as a process B existing simultaneously with the process A at the same time.

The Y Huffman coding combination 730, the Cb Huffman coding combination 732, and the Cr Huffman coding combination 734 can be distributed as threads for internal processors in the image processor 112 if the image processor 112 has a plurality of internal processors or co-processing elements sharing a common memory space. For example, the Y Huffman coding combination 730 is processed as a thread A by a first core of the image processor 112, the Cb Huffman coding combination 732 is processed as a thread B by a second core of the image processor 102, the Cr Huffman coding combination 734 is processed as a thread C by a third core of the image processor 112, and the threads A, B, and C exist simultaneously with each other at the same time.

The Huffman coding combinations can be alternatively distributed to any of processors including the system processor 102 and the image processor 112, as well as to internal processors in the system processor 102 and the image processor 112 if they have, as threads, processes or tasks.

If the system processor 102 supports the SIMD instructions, then the second exemplary Huffman coding explained in the section (1-4-2) can be executed by the system processor 102. The memory space may be defined for the system memory 106. The memory space may cover the system ROM 108 also. The system processor 102 may include an internal controller 132 capable for multithreading registers 124 as the registers and an ALU (Arithmetic Logic Unit) 126 capable of applying the SIMD instructions to the registers.

If the image processor 112 supports SIMD instructions, then the second exemplary Huffman coding explained in the section (1-4-2) can be executed by the image processor 112. The memory space may be defined for the page memory 106. The image processor 112 may include registers 128 as the registers and an ALU 130 capable of applying the SIMD instructions to the registers.

The actions included in the second exemplary Huffman coding can be distributed to any of processors including the system processor 102 and the image processor 112, as well as to internal processors in the system processor 102 and the image processor 112 if they have, as threads, processes or tasks. That is, the actions included in the second exemplary Huffman coding can be executed in multithreading, multiprocessing, and/or multitasking. But the image processor 112 may assume the preprocessing because the system processor 102 has other tasks.

If the image processor 112 has a plurality of internal processors, then the branch on the acts 1112 through 1113 and the branch on the acts 1114 through 1118 can be distributed as threads or processes to the internal processors respectively for execution simultaneously. The branch on the act 1124 and the branch on the acts 1120 through 1122 can be distributed as threads or processes to the internal processors respectively for execution simultaneously. The act 1144 and the act 1146 can be distributed as threads or processes to the internal processors, respectively, for execution simultaneously.

As used in this application, entities for executing the actions can refer to a computer-related entity, either hardware, a combination of hardware and software, software, or software in execution. For example, an entity for executing an action can be, but is not limited to being, a process running on a processor, a processor, an object, an executable, a thread of execution, a program, and a computer. By way of illustration, both an application running on a document processing machine and the document processing machine can be an entity. One or more entities can reside within a process and/or thread of execution and a entity may be localized on one document processing machine and/or distributed between two or more document processing machines.

Although the invention is shown and described with respect to certain illustrated aspects, it will be appreciated that equivalent alterations and modifications will occur to others skilled in the art upon the reading and understanding of this specification and the annexed drawings. In particular regard to the various functions performed by the above described components, the terms used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

What is claimed is:

1. An image data compressing apparatus, comprising:
a first register configured to store a plurality of data components of an original image data;
a second register configured to store a first bit sequence comprising a first value and a second value, the second register comprising a first group of bits associated with zero data components in the plurality of data components and a second group of bits associated with non-zero data components in the plurality of data components, each bit of the first group being assigned the first value, each bit of the second group being assigned the second value, the second value different form the first value;
a third register configured to store a value shifted from the first bit sequence by a first number;
a first arithmetic logic unit configured to obtain the first number of the first value continuing in the second register and a significant bit length of at least one of the plurality of data components, configured to obtain a second number of the first value continuing in the third register, and configured to translate a combination of the first number and the significant bit length to a code; and
a memory access unit configured to store the code as a part of a bit stream of a compressed image data.

2. The apparatus of claim 1, further comprising:
the third register stores additive inverses of the plurality of data components.

3. The apparatus of claim 1,
wherein the third register stores subsidiary values, each subsidiary value corresponding to each of the plurality of data components subtracted by one.

4. The apparatus of claim 2, further comprising:
a fourth register configured to store subsidiary values, each subsidiary value corresponding to each of the plurality of data components subtracted by one; and
a second arithmetic logic unit configured to obtain a second bit sequence simultaneously with the first arithmetic logic unit obtaining the additive inverses and the subsidiary values, the second bit sequence representing results of determinations whether each of the plurality of data components is greater than zero.

5. The apparatus of claim 3, further comprising:
the third register stores a first multi-bit data and a second multi-bit data in units of a multi-bit, the first multi-bit data indicating the first value at LSB, the second multi-bit data indicating the second value at LSB, the first multi-bit data being assigned to each units of multi-bit associated with the zero data components, the second multi-bit data being assigned to each units of multi-bit associated with the non-zero data components, wherein the second register stores a gathered value as the value in the first group and the second group, the gathered value comprises an aggregation from the LSBs of each units of multi-bit in the third register.

6. The apparatus of claim 1, further comprising:
a second arithmetic logic unit configured to assign the gathered value to the second register simultaneously with the first arithmetic logic unit obtaining the significant bit length.

7. The apparatus of claim 1, further comprising:
a fourth register configured to store additive inverses of the plurality of data components;
a fifth register configured to store subsidiary values, each subsidiary value corresponding to each of the plurality of data components subtracted by one; and
a second arithmetic logic unit configured to obtain the additive inverses and the subsidiary values simultaneously with the first arithmetic unit associating a first multi-bit data with each of zero data components in the plurality of data components and the second multi-bit data with each of non-zero data components in the plurality of data components.

8. The apparatus of claim 1, further comprising:
a fourth register configured to store results of determinations whether each of the plurality of data components is greater than zero; and
a second arithmetic unit configured to collect positive values simultaneously with the first arithmetic unit gathering values of LSBs of all of the plurality of data components to the second register, the positive values being selected from the plurality of data components or the additive inverses according to the fourth register;
wherein the first arithmetic unit obtains the significant bit length according to the positive values.

9. The apparatus of claim 2, further comprising:
a fourth register configured to obtain a second bit sequence which represents results of determinations whether each of the plurality of data components is greater than zero; and a fifth register configured to store positive values collected from the plurality of data components or the additive inverses according to the second bit sequence.

10. The apparatus of claim 9, wherein the first arithmetic logic unit obtains the significant bit length based on the positive values stored in the fifth register.

11. The apparatus of claim 1, further comprising:

a fourth register configured to store a second bit sequence which represents results of determinations whether each of the plurality of data components is greater than zero; and a fifth register configured to store positive values collected from the plurality of data components or the subsidiary values according to the second bit sequence.

12. The apparatus of claim 11, wherein the memory access unit connects one of values in the fifth register to the bit stream following the code.

* * * * *